US011271709B1

United States Patent
Kratz et al.

(10) Patent No.: US 11,271,709 B1
(45) Date of Patent: *Mar. 8, 2022

(54) FREQUENCY AND GAIN CALIBRATION FOR TIME SYNCHRONIZATION IN A NETWORK

(71) Applicants: Philip A. Kratz, Redwood City, CA (US); Daniel M. Jacker, Redwood City, CA (US); Mainak Chowdhury, Redwood City, CA (US); Alexander Hooshmand, Redwood City, CA (US)

(72) Inventors: Philip A. Kratz, Redwood City, CA (US); Daniel M. Jacker, Redwood City, CA (US); Mainak Chowdhury, Redwood City, CA (US); Alexander Hooshmand, Redwood City, CA (US)

(73) Assignee: ZaiNar, Inc., Redwood City, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/135,566

(22) Filed: Dec. 28, 2020

Related U.S. Application Data

(63) Continuation of application No. 16/588,722, filed on Sep. 30, 2019, now Pat. No. 10,911,211.

(Continued)

(51) Int. Cl.
*H04L 7/00* (2006.01)
*H04B 17/309* (2015.01)
(Continued)

(52) U.S. Cl.
CPC ............ *H04L 7/0012* (2013.01); *H04B 17/11* (2015.01); *H04B 17/21* (2015.01); *H04B 17/309* (2015.01)

(58) Field of Classification Search
CPC ..... H04L 7/0012; H04B 17/21; H04B 17/309; H04B 17/11
(Continued)

(56) References Cited

U.S. PATENT DOCUMENTS 5,828,670 A  10/1998 Narasimha et al.
5,920,287 A  7/1999 Belcher et al.
(Continued)

OTHER PUBLICATIONS

"GPS Accuracy," http://www.gps.gov/systems/gps/performance/accuracy/ (Accessed Jul. 12, 2018).
(Continued)

*Primary Examiner* — Fitwi Y Hailegiorgis
(74) *Attorney, Agent, or Firm* — Run8 Patent Group, LLC; Peter Miller; Alexander R. Flake

(57) ABSTRACT

A method includes, at a first node: transmitting a first calibration signal at a first time-of-departure measured by the first node; and transmitting a second calibration signal at a second time-of-departure measured by the first node. The method also includes, at a second node: receiving the first calibration signal at a first time-of-arrival measured by the second node; and receiving the second calibration signal at a second time-of-arrival measured by the second node. The method further includes: defining a first calibration point and a second calibration point in a set of calibration points, each calibration point comprising a time-of-departure and a time-of-arrival of each calibration signal; calculating a regression on the set of calibration points; and calculating a frequency offset between the first node and the second node based on the first regression.

20 Claims, 15 Drawing Sheets

Related U.S. Application Data

(60) Provisional application No. 62/738,889, filed on Sep. 28, 2018.

(51) Int. Cl.
*H04B 17/21* (2015.01)
*H04B 17/11* (2015.01)

(58) Field of Classification Search
USPC .......................................................... 375/362
See application file for complete search history.

(56) References Cited

U.S. PATENT DOCUMENTS

| | | | |
|---|---|---|---|
| 6,040,805 A | 3/2000 | Huynh et al. | |
| 6,237,051 B1 | 5/2001 | Collins | |
| 6,445,927 B1 | 9/2002 | King et al. | |
| 6,490,727 B1 * | 12/2002 | Nazarathy | H04J 14/0226 348/E7.071 |
| 6,738,628 B1 | 5/2004 | McCall et al. | |
| 6,920,287 B1 | 7/2005 | Hinds et al. | |
| 7,177,656 B2 | 2/2007 | Pinault | |
| 7,302,269 B1 | 11/2007 | Crawford et al. | |
| 7,688,349 B2 | 3/2010 | Flickner et al. | |
| 7,839,916 B1 | 11/2010 | Luecke et al. | |
| 7,924,153 B1 | 4/2011 | Furey et al. | |
| 7,957,336 B2 | 6/2011 | Amos et al. | |
| 8,223,009 B2 | 7/2012 | Anderson et al. | |
| 8,300,615 B2 | 10/2012 | Copeland et al. | |
| 8,314,704 B2 | 11/2012 | Cova et al. | |
| 8,570,904 B2 | 10/2013 | Lemkin et al. | |
| 8,674,822 B2 | 3/2014 | Priyantha et al. | |
| 9,110,157 B2 | 8/2015 | Levin et al. | |
| 9,734,480 B2 | 8/2017 | Kerai | |
| 9,945,940 B2 | 4/2018 | Min et al. | |
| 10,455,350 B2 | 10/2019 | Kratz et al. | |
| 10,627,474 B1 | 4/2020 | Kratz et al. | |
| 10,681,500 B2 | 6/2020 | Kratz et al. | |
| 10,911,211 B1 * | 2/2021 | Kratz | H04B 17/21 |
| 2007/0205944 A1 | 9/2007 | Lyons | |
| 2010/0114407 A1 | 5/2010 | Klooster et al. | |
| 2012/0143397 A1 | 6/2012 | Mackay et al. | |
| 2013/0324154 A1 | 12/2013 | Raghupathy et al. | |
| 2014/0055243 A1 | 2/2014 | Kerai | |
| 2014/0256347 A1 | 9/2014 | Lakhzouri et al. | |
| 2014/0270805 A1 * | 9/2014 | Mani | H04J 3/0667 398/155 |
| 2014/0288996 A1 | 9/2014 | Renee et al. | |
| 2015/0358930 A1 | 12/2015 | Navalekar et al. | |
| 2018/0014151 A1 | 1/2018 | Kratz et al. | |
| 2018/0041329 A1 | 2/2018 | Wang et al. | |
| 2018/0110020 A1 | 4/2018 | Sahlin et al. | |
| 2019/0058556 A1 | 2/2019 | Siomina et al. | |
| 2019/0072636 A1 | 3/2019 | Herrn et al. | |
| 2019/0191403 A1 | 6/2019 | Goel et al. | |
| 2019/0238292 A1 | 8/2019 | Siomina et al. | |
| 2019/0280898 A1 | 9/2019 | Kumar et al. | |
| 2019/0369201 A1 | 12/2019 | Akkarakaran et al. | |
| 2019/0373594 A1 | 12/2019 | Sadiq et al. | |
| 2020/0112498 A1 | 4/2020 | Manolakos et al. | |

OTHER PUBLICATIONS

Dual GPS Solutions, "XGPS150A," http://gps.dualav.com/explore-by-product/xgps150a/ (Accessed Mar. 2, 2016.).

Kalisz, Jozef. "Review of methods for time interval measurements with picosecond resolution" Metrologia 411 (2003.

Kevin Curran, Eoghan Furey, Tom Lunney, Jose Santos, Derek Woods and Aiden Mc Caughey, "An Evaluation of Indoor Location Determination Technologies," Journal of Location Based Services vol. 5, No. 2, pp. 61-78 (2011).

Kiang, Jie, and Kyle Jamieson. "Array Track: a fine-grained indoor location system." Presented as part of the 1othUSENIX Symposium on Networked Systems Design and Implementation (NSDI 13). 2013.

Notice of Allowance issued in U.S. Appl. No. 16/186,336 dated Dec. 10, 2019.

Notice of Allowance issued in U.S. Appl. No. 16/405,922 dated Jun. 19, 2020.

Office action issued in U.S. Appl. No. 15/644,717 dated Dec. 5, 2018.

Office action issued in U.S. Appl. No. 16/186,336 dated Oct. 24, 2019.

Office action issued in U.S. Appl. No. 16/405,922 dated Dec. 31, 2019.

Office action issued in U.S. Appl. No. 16/559,795 dated Nov. 22, 2019.

Office action issued in U.S. Appl. No. 16/588,722 dated Aug. 20, 2020.

Office action issued in U.S. Appl. No. 17/135,566 dated Jul. 9, 2021.

Paul A Zanderberg, "Accuracy of iPhone Locations: A Comparison of Assisted GPS, WiFi and Cellular Positioning," Transactions in GIS, 13(s1): 5-26 (2009 ).

William J Hughes Technical Center, "Global Positioning System (GPS) Standard Positioning Service (SPS) Performance Analysis Report" (Jul. 31, 2014.).

* cited by examiner

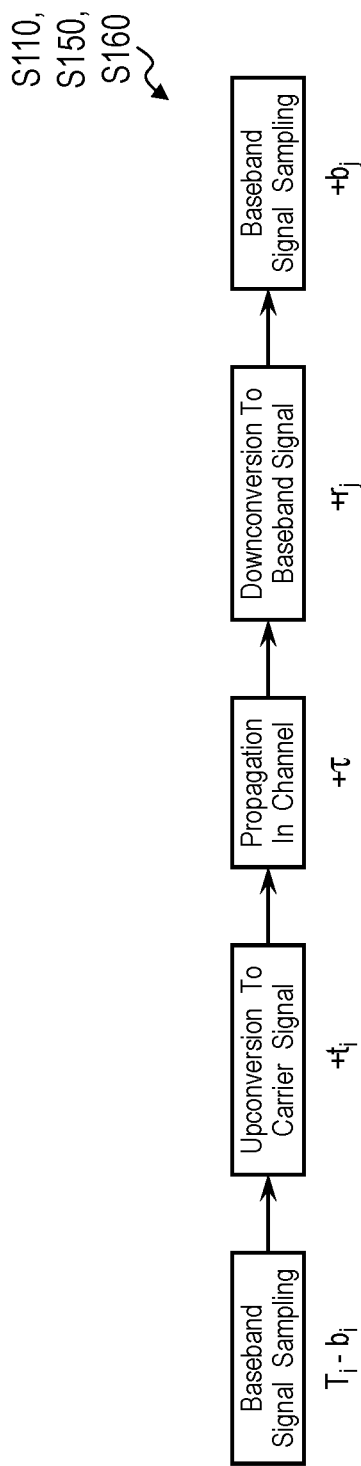
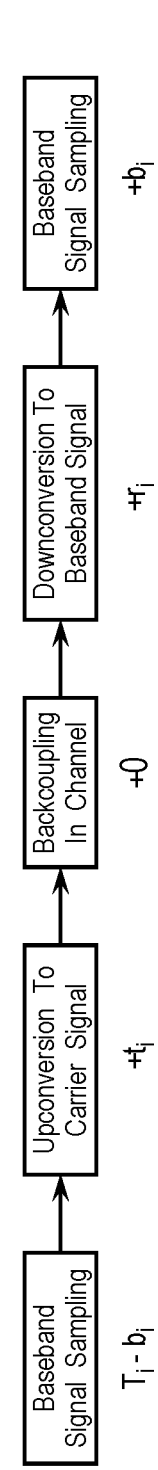
FIG. 5A
FIG. 5B

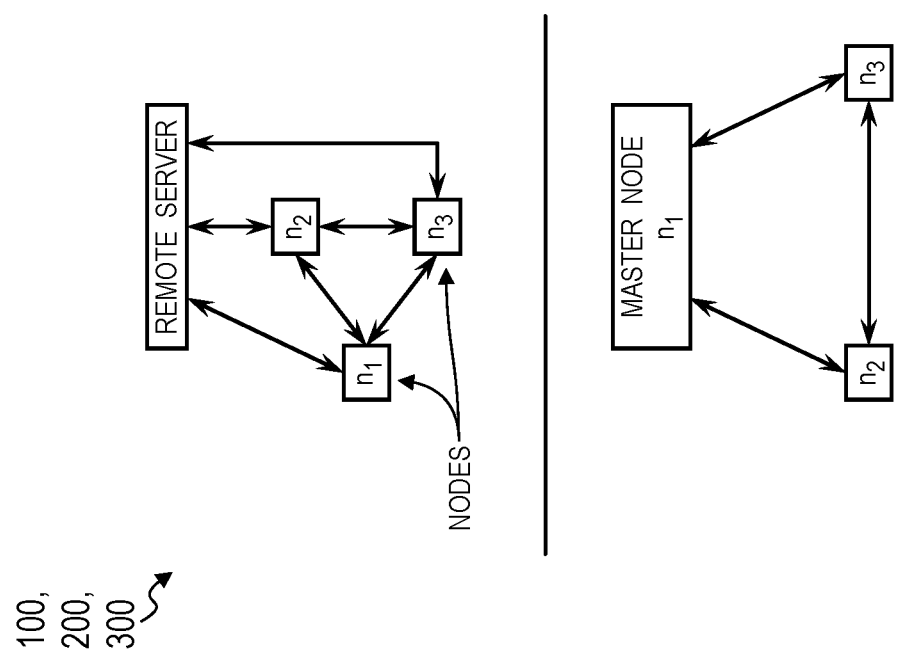

FREQUENCY AND GAIN CALIBRATION FOR TIME SYNCHRONIZATION IN A NETWORK

CROSS-REFERENCE TO RELATED APPLICATIONS

This Application is a continuation application of U.S. patent application Ser. No. 16/588,722, filed on 30 Sep. 2019, which claims the benefit of U.S. Provisional Application No. 62/738,889, filed on 28 Sep. 2018, both of which are incorporated in their entireties by this reference.

This Application is related to U.S. patent application Ser. No. 14/405,922, filed on 7 May 2019, which is incorporated in its entirety by this reference.

TECHNICAL FIELD

This invention relates generally to the field of networking and digital communication and more specifically to a new and useful method for accurate network time synchronization in the field of networking and digital communication.

BRIEF DESCRIPTION OF THE FIGURES

FIG. 5A is a flowchart representation of transmission and reception of a synchronization signal;
and
FIG. 5B is a flowchart representation of transmission and reception of a self-receive signal.
FIG. 11 is a schematic representation of a system.

DESCRIPTION OF THE EMBODIMENTS

The following description of embodiments of the invention is not intended to limit the invention to these embodiments but rather to enable a person skilled in the art to make and use this invention. Variations, configurations, implementations, example implementations, and examples described herein are optional and are not exclusive to the variations, configurations, implementations, example implementations, and examples they describe. The invention described herein can include any and all permutations of these variations, configurations, implementations, example implementations, and examples.

1. First Method

Figure 1A:
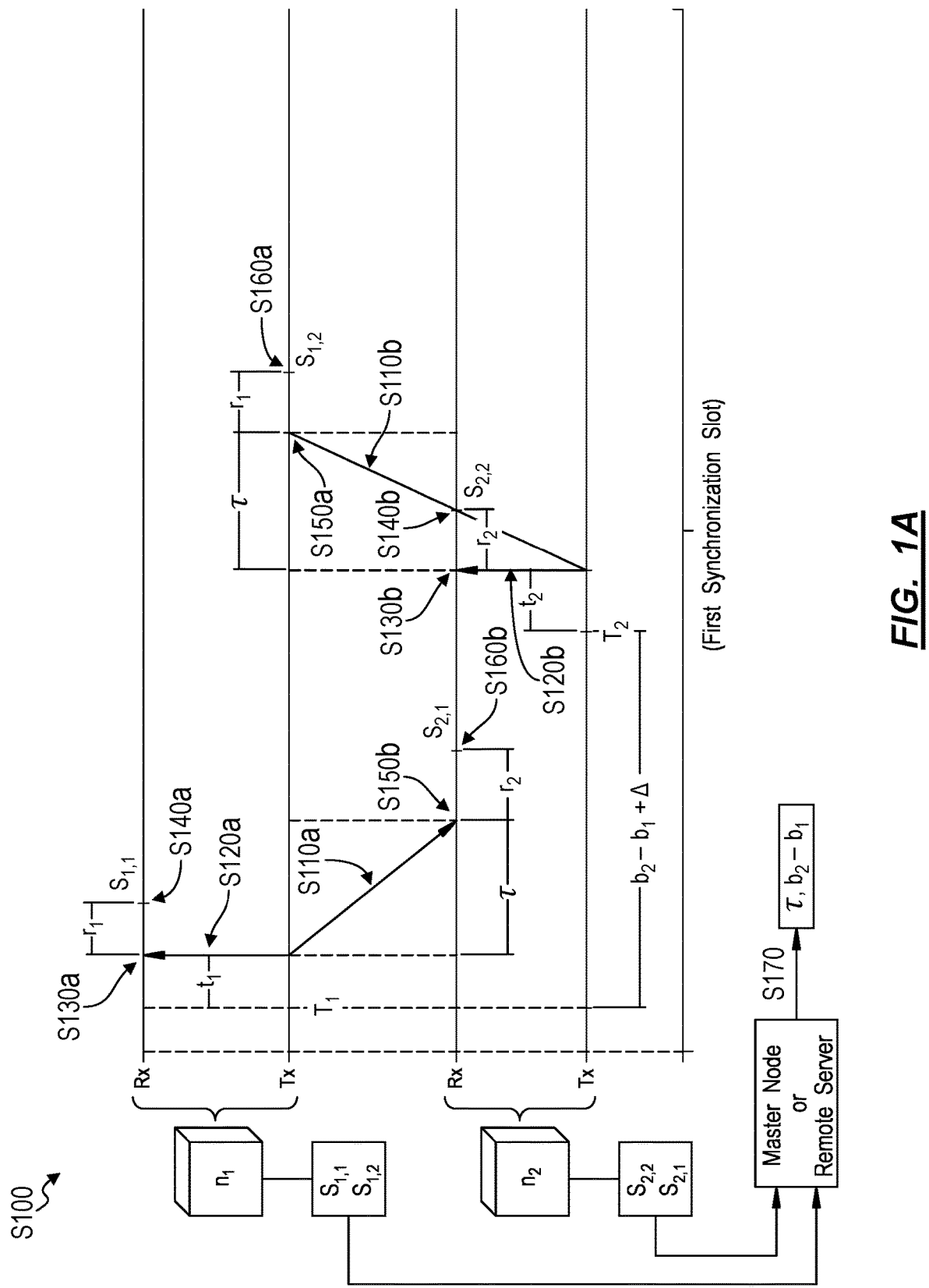
FIG. 1A is a flowchart representation of a method.

As shown in FIG. 1A, a method S100 for characterizing time bias and propagation delay between a pair of nodes includes, at a first node in the pair of nodes and during a first synchronization slot: transmitting a first synchronization signal at a first time according to a first clock of the first node in Block S110A; back-coupling the first synchronization signal to generate a first self-receive signal in Block S120A; receiving the first self-receive signal in Block S130A; calculating a time-of-arrival of the first self-receive signal according to the first clock in Block S140A; receiving a second synchronization signal from the second node in Block S150A; and calculating a time-of-arrival of the second synchronization signal according to the first clock in Block S160A. The method S100 also includes, at the second node and during the first synchronization slot: transmitting the second synchronization signal at a second time according to a second clock of the second node in Block S110B; back-coupling the second synchronization signal to generate a second self-receive signal in Block S120B; receiving the second self-receive signal in Block S130B; calculating a time-of-arrival of the second self-receive signal according to the second clock in Block S140B; receiving the first synchronization signal from the first node in Block S150B; and calculating a time-of-arrival of the first synchronization signal according to the second clock in Block S160B. The method S100 further includes calculating a time bias and a propagation delay between the pair of nodes based on the time-of-arrival of the first self-receive signal and the time-of-arrival of the second synchronization signal, the time-of-arrival of the second self-receive signal and the time-of-arrival of the first synchronization signal at the second node in Block S170.

Figure 1B:
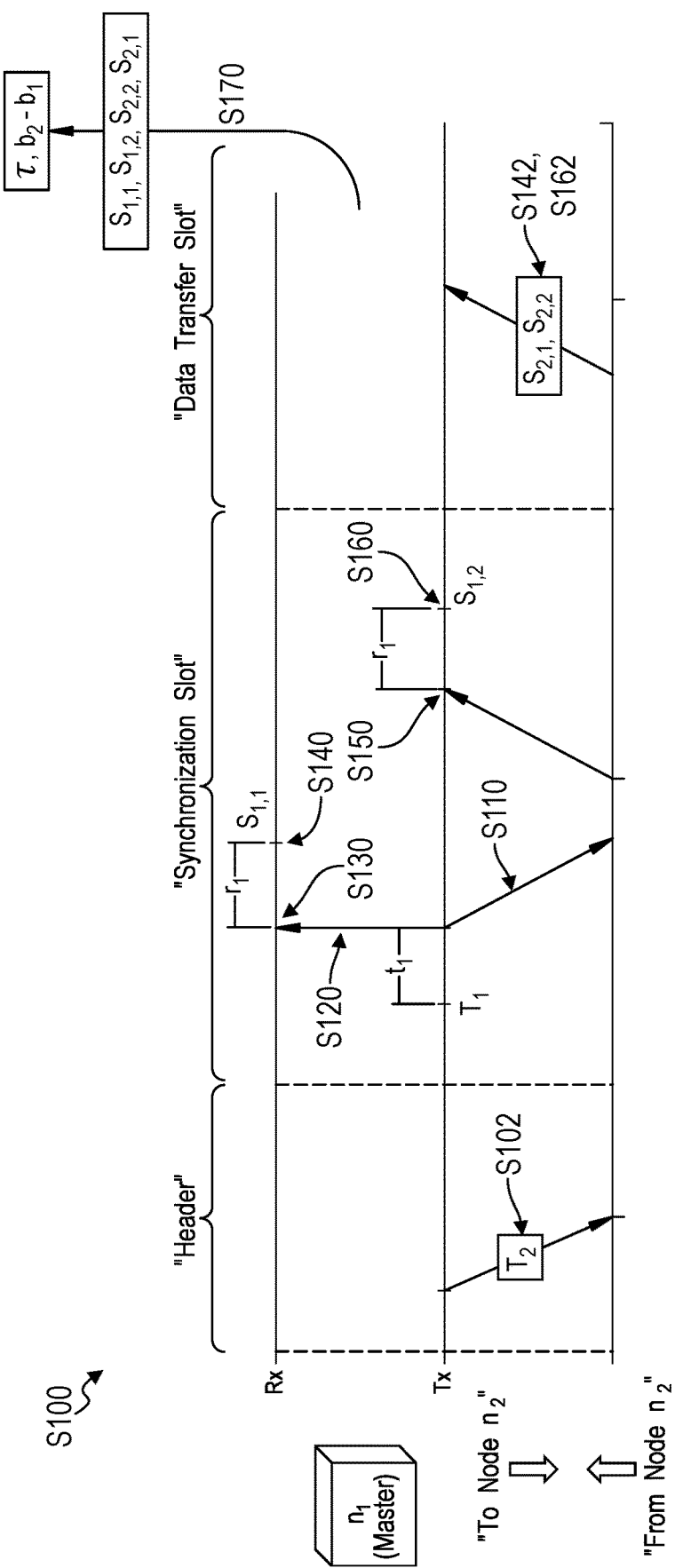
FIG. 1B is a flowchart representation of a first variation of the method.

As shown in FIG. 1B, a first variation of the method S100 includes: transmitting a coordination signal to a second node in the pair of nodes, the coordination signal indicating a second time to transmit a second synchronization signal in Block S102; transmitting a first synchronization signal at a first time according to a first clock of the first node in Block S110; back-coupling the first synchronization signal to generate a first self-receive signal in Block S120; receiving the first self-receive signal in Block S130; calculating a time-of-arrival of the first self-receive signal according to the first clock in Block S140; receiving the second synchronization signal, the second synchronization signal transmitted by the second node at the second time according to a second clock of the second node in Block S150; calculating a time-of-arrival of the second synchronization signal according to the first clock in Block S160; receiving a time-of-arrival of a second self-receive signal from the second node, the second self-receive signal back-coupled by the second node upon transmission of the second synchronization signal, the time-of-arrival of the second self-receive signal calculated according to the second clock in Block S142; receiving a time-of-arrival of the first synchronization signal from the second node, the time-of-arrival of the first synchronization signal calculated by the second node according to the second clock in Block S162; and calculating a first time bias between the first clock and the second clock and a first propagation delay between the first node and the second node based on the time-of-arrival of the first self-receive signal, the time-of-arrival of the first synchronization signal, the time-of-arrival of the second self-receive signal, and the time-of-arrival of the second synchronization signal in Block S170.

Figure 1C:
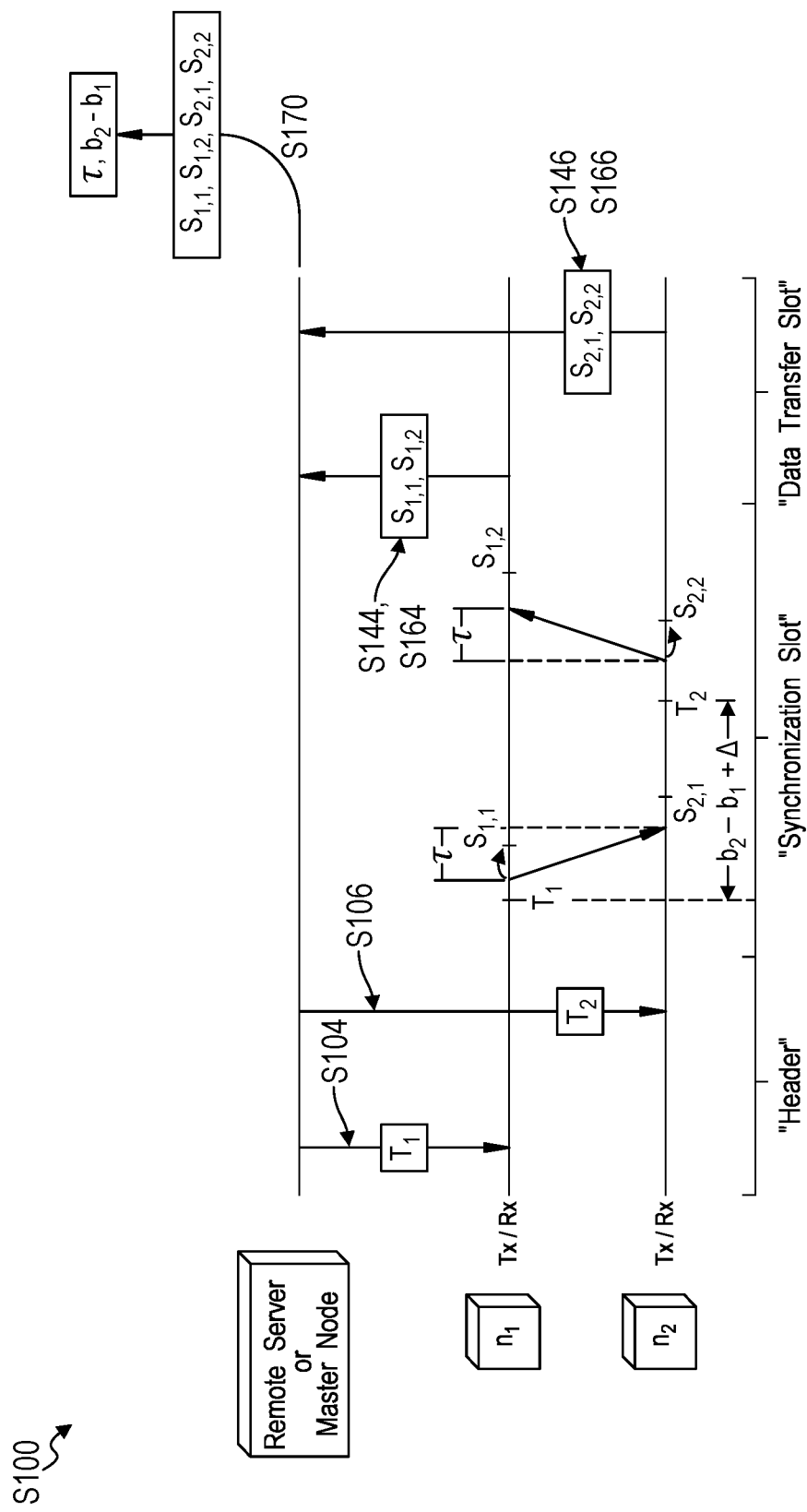
FIG. 1C is a flowchart representation of a second variation of the method.

As shown in FIG. 1C, a second variation of the method S100 includes scheduling transmission of a first synchronization signal at a first time by a first node in Block S140; and scheduling transmission of a second synchronization signal at a second time by a second node in Block S106. The second variation of the method S100 also includes, after transmission of the first synchronization signal by the first node at the first time according to a first clock of the first node: receiving, from the first node, a time-of-arrival of a first self-receive signal according to the first clock, wherein the first self-receive signal is a back-coupled version of the first synchronization signal in Block S144; and receiving, from the second node, a time-of-arrival of the first synchronization according to a second clock of the second node in Block S164. The second variation of the method S100 further includes, after transmission of the second synchronization signal by the second node at the second time according to the second clock: receiving, from the second node, a time-of-arrival of a second self-receive signal according to the second clock, wherein the second self-receive signal is a back-coupled version of the second synchronization signal in Block S146; and receiving, from the first node, a time-of-arrival of the second synchronization signal according to the first clock in Block S166. The second variation of the method S100 also includes calculating a first time bias between the first clock and the second clock and a first propagation delay between the first node and the second node based on the time-of-arrival of the first self-receive signal, the time-of-arrival of the first synchronization signal, the time-of-arrival of the second self-receive signal, and the time-of-arrival of the second synchronization signal in Block S170.

A third variation of the method S100 includes: predicting a drift magnitude of the time bias between the first node and the second node between the first synchronization slot and the second synchronization slot based on a predictive drift model in Block S180; and setting a duration of the second synchronization slot equal to a sum of the maximum time bias uncertainty, the maximum accumulated drift magnitude over the duration of the first synchronization signal, the propagation delay, and a duration of the first synchronization signal in Block S190.

1.1 Applications

Generally, the method S100 is executed by a pair of node devices (hereinafter "nodes") in a network and/or remote servers (hereinafter "the system", as shown in FIG. 11) in order to synchronize—such as to within one nanosecond—the clocks of the pair of nodes. The method S100 can calculate the time bias between clocks to within one nanosecond or with sub-nanosecond precision without prior information regarding the position of the two nodes (or even a requirement for the nodes to be stationary), without precise calibration of the hardware of either node, and with each node using standard electronic clock technology, such as a crystal oscillator clock. Additionally, the method S100 can utilize a frequency bandwidth of less than five megahertz. The small bandwidth of the method S100 enables transmission of frequency bands with high propagation range and/or penetration. Examples of such bands include frequency bands for cellular communications or public safety uses (e.g., the 902-928 MHz ISM band or sub-GHz cellular band). Thus, the method S100 enables applications such as time-synchronized distributed antenna systems, which can further enable precise localization of RF emitting devices, remote sensing of public safety infrastructure, and improvements in time-based data transfer protocols.

More specifically, the method S100 for synchronizing time between two nodes can be categorized as a two-way ranging and synchronization protocol. However, the method S100 is distinguished from other two-way ranging protocols in that each node transmits independently of other nodes at an absolute time (according to the clock of each node), as opposed to transmitting in response to receiving signals from a master node in the pair. Furthermore, each node is configured to execute a scheme to provide a local reference copy of the transmitted signal, within the transceiver hardware of the node, in order to provide a "time-of-departure" for each transmitted synchronization signal (via a back-coupling and/or reflection of a transmitted synchronization signal). The time-of-arrival of this reflected and/or back-coupled version of a transmitted synchronization signal (hereinafter a "self-receive signal") includes the transmit and receive chain delays that are incurred by a signal transmitted by another node, thereby enabling direct comparison of the time-of-arrival of various signals without precise characterization of these delays.

Blocks of the method S100 can be executed by a system 100, which can include a pair of node devices (i.e., nodes) in a mesh network, a master node and a slave node in a mesh network, and/or a remote server coordinating with a pair of nodes in a mesh network. Each node in the mesh network can include networking hardware, such as an antenna, transceiver hardware, an FPGA/DPS, a clock, and self-receive hardware (e.g. directional couplers, RF power splitters, combiners, circulators, etc.) further described below. However, the method S100 can also be performed between nodes in a wired network. The nodes in the mesh network are mutually connected to the internet or to a local area network such that the initial time bias between any pair of nodes in the mesh network is initially limited by the network time protocol (hereinafter "NTP"), or any other network time synchronization protocol. This time bias can range from tens of milliseconds to microseconds in many state-of-the-art networks. In one implementation, the system can execute a second method S200 (for detecting and compensating for frequency drift between nodes) and/or a third method S300 (for calibrating gain levels for signal transmission between nodes) prior to executing the first method S100. The second method S200 and the third method S300 are described in greater detail below.

Nodes in the mesh network communicate with each other using time division multiple access (hereinafter "TDMA") and/or code division multiple access (hereinafter "CDMA"), thereby minimizing frequency bandwidth usage. Thus, the nodes can execute Blocks of the method S100 during one or more synchronization slots within a TDMA frame structure. In one implementation, synchronization slot duration and frame length are dynamically adjustable. In particular, the method S100 can leverage smaller initial time biases between a pair of nodes to decrease synchronization slot duration and further reduce uncertainty in the time bias calculation. Furthermore, the frame structure can include data transfer frames enabling the nodes to communicate with each other or with a remote server via the internet protocol suite in order to execute blocks of the method S100. For example, nodes can transfer a set of time-of-arrivals to a remote server for further processing according to the method S100.

Assuming an initial coarse clock synchronization between a pair of nodes (e.g. one to ten milliseconds), each of the pair of nodes transmits a synchronization signal to the other node at the beginning of the synchronization slot according to each node's clock. However, due to the relative time bias between each of the nodes, these synchronization signals are sent at times offset by the time bias between the two nodes. The synchronization signal is a frequency modulated, amplitude modulated, or phase modulated pseudorandom code or a combination of multiple codes (e.g., on multiple center carrier frequencies). Upon receiving the synchronization signal from the other node in the pair of nodes each node calculates a time-of-arrival (hereinafter "TOA"), such as by using the magnitude, time offset, and carrier phase of the autocorrelation peaks associated with one or more codes.

Figure 3A:
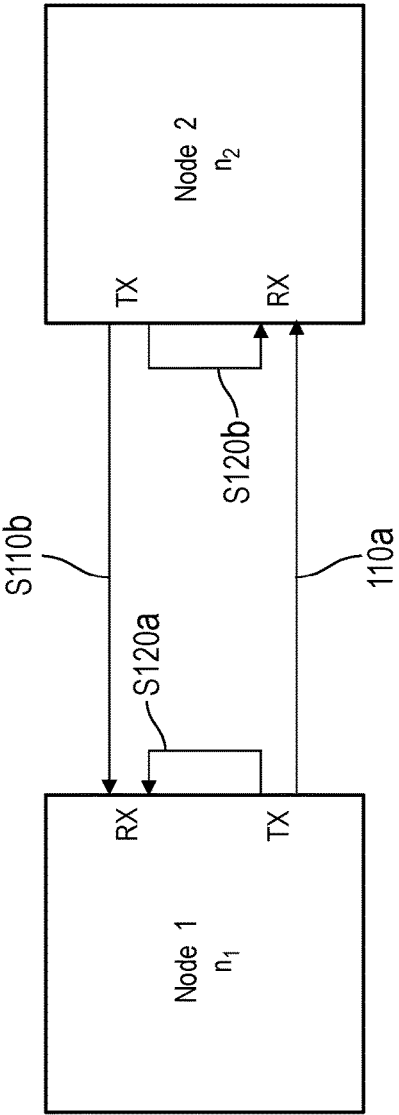
FIG. 3A is a schematic representation of a pair of nodes in the mesh network.

Upon sending the synchronization signal, each node includes self-receive hardware (shown in FIG. 3C) that back-couples and/or internally reflects a portion of the synchronization signal, thereby generating a self-receive signal, as shown in FIG. 3A. The self-receive hardware reflects and/or back-couples an attenuated repetition of the outgoing synchronization signal, which is then received by the same node that transmitted the synchronization signal. Each node then calculates a TOA for the self-receive signal after the self-receive signal has passed through the receiver chain in the same manner as any other received signal. Thus, the TOA of the self-receive signal acts as a time-of-departure of the synchronization signal offset by the receiver delay time of the transmitting node. The method S100 includes generating the self-receive signal such that the TOA of an incoming synchronization signal from another node can be directly compared to a time-of-departure of an outgoing node without the need for precise measurement and/or calibration of the receiver delay.

Each node in the pair then receives the synchronization signal from the other node and calculates a TOA for the synchronization signal. Therefore, by the end of the synchronization slot, each node has recorded a TOA for a self-receive signal and for a synchronization signal of the other node. These TOAs are then transmitted to one of the nodes or to a remote server to solve a system of two equations for two unknowns: the relative time bias between the pair of nodes (including receiver delay) and the propagation delay (i.e., transmission time) between the pair of nodes. This system of equations is solvable based on the reciprocity theorem of electromagnetism. The relative time bias between clocks of the two nodes can then be calculated and tracked by a master node or a remote server coordinating the mesh network. Alternatively, the relative time bias between nodes can then be reported to both nodes and one node (i.e., a slave node) can then synchronize its clock to match the other (i.e., a master node).

Although the first synchronization between the two node clocks according to the method S100 may be highly accurate, greater accuracy and reduced TDMA overhead is achieved through slot refinement, wherein the synchronization slot duration is reduced based on the smaller time bias between the two clocks. Therefore, in each successive synchronization slot for the pair of nodes the synchronization slot duration is decreased, thereby reducing sources of error such as accumulated jitter and/or environmental frequency drift that may occur during the synchronization process. For example, a quartz crystal oscillator may be expected to have a drift of six PPM which corresponds to six nanoseconds of drift during a millisecond duration synchronization slot. If the synchronization slot duration is instead reduced to 100 microseconds, the expected drift is reduced to less than one nanosecond.

By executing synchronization slot refinement techniques the system can also increase the duration of time within a frame for data transmission thereby improving data transfer rates for the nodes. Additionally, with a shorter synchronization slot duration, the method S100 can be performed at a higher rate of repetition thereby improving synchronization during changing environmental conditions.

After synchronization has occurred between a pair of nodes in the mesh network, the method S100 can be executed on a pairwise basis with other nodes in the mesh network in successive synchronization slots, thereby distributing time across the entire mesh network.

In some implementations, the method S100 leverages repetitive synchronization between two nodes and pairwise synchronization between multiple nodes in the network, in combination with environmental data recorded from inertial measurement units (hereinafter "IMUs") or temperature sensors within each node, to create a predictive drift model for each node in the mesh network. The predictive drift model can characterize the time drift of a node as a function of measured environmental input data over time. The method S100 can also include triggering a synchronization slot in the next frame or altering the length of the synchronization slot based on the output of the predictive drift model. Alternatively, the method S100 can include adjusting a node's clock between synchronization slots.

1.2 Examples

The method S100 for synchronizing time between two node devices has wide ranging benefits including: more precise and flexible localization using a time synchronized mesh network of nodes; and improvements to time or frequency-based communication protocols.

In one example application of the method S100, a mesh network of nodes can perform the method S100 on a pairwise basis to synchronize their clocks across the mesh network. Each of the nodes in the mesh network can then individually calculate a TOA of a signal from an RF emitting source not included in the mesh network. By comparing TOAs between the nodes in the mesh network and performing multilateration, the location of the RF emitting source can be calculated to a degree of precision limited by temporal synchronization between nodes. For example, with temporal synchronization within one nanosecond, the location of an RF emitting source can be calculated to within 30 centimeters relative to the nodes in the mesh network. If one node in the mesh network acts as an anchor node and is calibrated with accurate global positional information, the absolute position of the RF emitting source can also be detected.

In one example application of mesh network-based localization, nodes are distributed throughout an area, within buildings, or even on cars driving on the streets of an urban area. The nodes execute Blocks of the method S100 to periodically synchronize their clocks and then collect TOA data for other RF emitting sources within the mesh area. The remote server coordinating with the nodes can subsequently transform these TOA data into three-dimensional geospatial locations of the RF emitting sources, thereby improving location services, asset tracking, and object detection. Thus, the remote server or master node can: calculate a relative location of nodes in the network based on the propagation delay between the nodes; receive, from several nodes in the mesh network, a time-of-arrival of a signal from a transmitting device; and calculate, via multilateration, a relative location estimate for the transmitting device accounting for the relative time bias between each of the nodes in the mesh network.

In another example, TDMA based protocols may be limited to slot durations of a few tens of milliseconds. Therefore, Blocks of the method S100 can be executed to synchronize clocks of devices within a wired or wireless network in order to more accurately calculate the time bias, enabling a reduction in dead time and interference between slots while improving bitrate and bandwidth due to reduced inefficiencies in the multiple access protocol.

1.3 Node Hardware

Figure 3B:
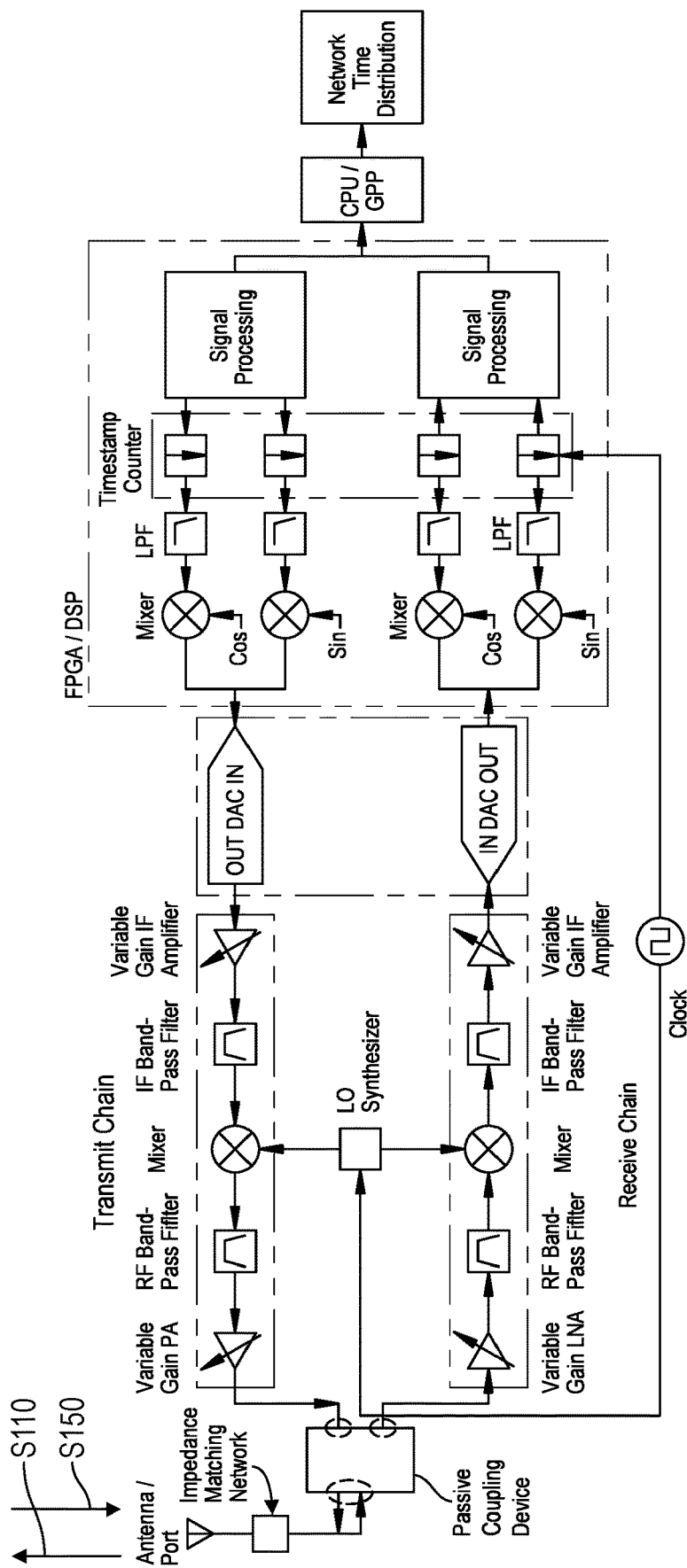
FIG. 3B is a schematic representation of a node in the mesh network.
Figure 3C:
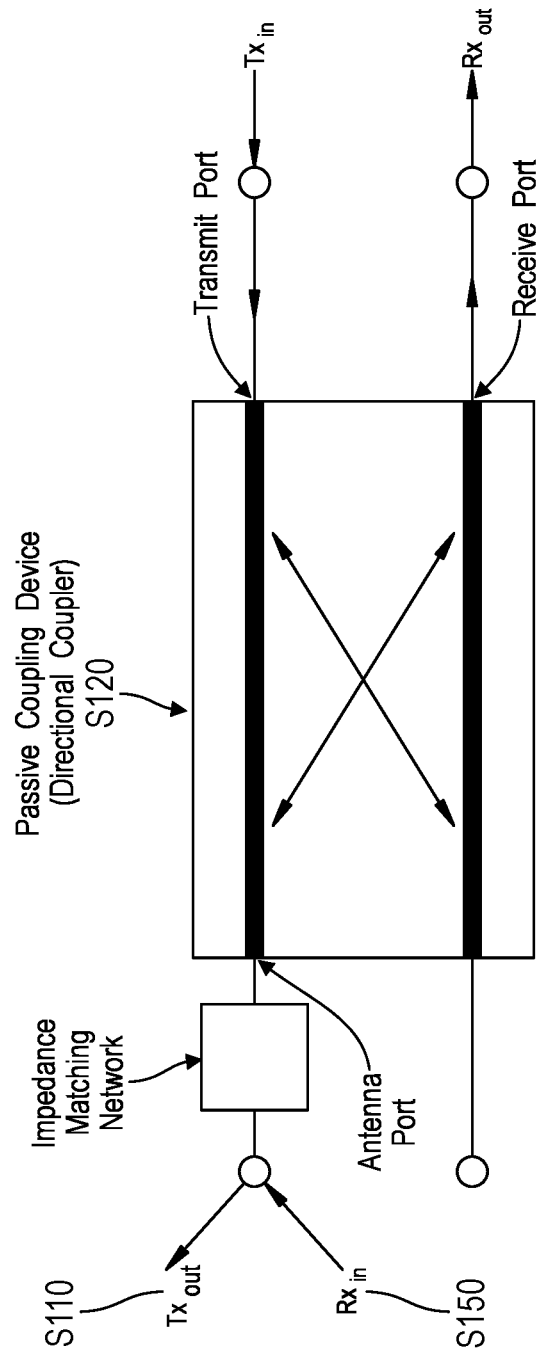
FIG. 3C is a schematic representation of self-receive hardware of a node.

As discussed above, the method S100 is executed by or via coordination with nodes in a network. Examples of hardware for wireless nodes are shown in FIGS. 3B and 3C. Generally, nodes include transmission components and receiver components, an FPGA or DSP configured to generate and process signals, a clock, and self-receive signal hardware.

In one implementation, the nodes transmit information wirelessly and as such include RF transceiver hardware such as a super heterodyne radio architecture and an Rx/Tx antenna shown in FIG. 3B. In this implementation, each node includes a "receive chain" and a "transmit chain." The receive chain includes a pipeline of hardware components that process signals received from the Rx port. The transmit chain includes a pipeline of hardware components that process transmission signals generated by the FPGA or DSP and feed them into the Tx port. The receive chain and the transmit chain impart a "receive chain delay" and a "transmit chain delay" respectively. "Receive chain delay" and "transmit chain delay" describe the amount of time elapsed as a signal traverses either the receive chain or the transmit chain respectively.

In an alternate implementation, the nodes can communicate over a wired network. In this implementation, the nodes can include an I/O port and/or appropriate interface converters for communicating over any wired medium (e.g. ethernet, fiber optic, etc.) instead of an antenna. These interface converters can also impart a receive chain and transmit chain delays upon transmitted and received signals.

In one implementation, a node includes extant transceiver infrastructure such as cell tower, mobile phone, or any other RF transceiving device that has been adapted to execute the method S100. A cell tower or other extant transceiver can be adapted to execute the method S100 via software means. In alternate implementations, the nodes can include hardware to improve the performance of the method S100, which can include impedance-matching networks at an antenna interface between a passive coupling device (e.g., coupling the transmit chain and the receive chain to the antenna).

In wireless node implementations, the FPGA or DSP of each node is configured to generate complex digital signals and output the generated signals to a DAC. The complex components of the digital signals represent the in-phase and quadrature portions (i.e., I/Q) of the analog signal to be generated by the DAC. Additionally, the FPGA or DSP of the node receives digital signals from the antenna of the node via an ADC and timestamps received synchronization signals according to an instant value of its own clock and a TOA calculation process further described below.

Each node includes a clock, such as a crystal oscillator clock or an atomic clock, which may be responsible for time-keeping functions at the node. The method S100 can be executed to synchronize the clocks of multiple nodes within a network. In particular, the method S100 can effectively synchronize crystal oscillator clocks that satisfy basic frequency stability, phase noise, and frequency requirements for wireless communication. In one example, the clock is a quartz crystal oscillator with an AT cut and a clock frequency of ten megahertz. However, a node can include a crystal oscillator of any frequency or cut assuming the aforementioned constraints are met.

Each node can include specific self-receive hardware, which back-couples and/or reflects a self-receive signal in Block S120. Generally, upon a node transmitting a synchronization signal, the self-receive hardware reflects and/or back-couples an attenuated repetition of the synchronization signal back to the receiving port of the transmitting node. By processing the transmitted synchronization signal via the receive chain and calculating a TOA for the self-receive signal, each node is able to timestamp transmitted signals delayed by the receive chain delay. When the node later receives a synchronization signal from another node, the TOA of the synchronization signal also incurs the same receive chain delay. Because the TOA of the self-receive signal and the TOA of the synchronization signal both include the receive chain delay, they can be directly compared without precise calibration of the receive chain hardware.

In one implementation, the self-receive hardware includes an impedance mismatched directional coupler shown in FIG. 3C. The self-receive hardware can also include a variable impedance circuit, which may be software controlled to vary the gain of the reflected Tx signal into the Rx port. Depending on the specific hardware implementation of the node, similar impedance-matching can be applied to circulators, power splitters, or any other transmission line device, as further described below. In one implementation, a node can include standard antenna interface hardware with unintentionally mismatched antenna impedance (e.g., characterized by a voltage standing wave ratio greater than one), which can function as the self-receive hardware by reflecting synchronization signals at the antenna interface. Thus, each node need not include specialized self-receive hardware in order to execute the method S100.

The self-receive hardware defines a tuned reflection coefficient for signals incident to the interface between a passive coupling device and the antenna of the node, by including an impedance-matching network between the antenna and the passive coupling device. The impedance-matching network transforms the impedance of the antenna to an impedance that effects a precise reflection coefficient between the passive coupling device and the antenna. The reflection coefficient is selected such that the reflected power of the self-reflected signal is above the noise floor of the ADC and below the saturation voltage of the ADC.

In another implementation, the matching network can maintain the reflection coefficient for a wide range of signal frequencies. For example, the self-receive hardware can include a switchable wideband matching network to improve the consistency of the reflection coefficient across a wide range of transmit frequencies. In this example, the self-receive hardware can actively switch between multiple impedance-matching networks depending on the frequency of the signal being transmitted by the node.

In yet another implementation, the self-receive hardware can include a frequency multiplexer connected to multiple impedance-matching networks such that each distinct impedance-matching network encounters signals at a frequency that results in the precise reflection coefficient.

In an additional implementation, the system 100 can include an adaptive impedance-matching network that can adjust its impedance and therefore the reflection coefficient between the passive coupling device and the antenna. The node can then use the adaptive impedance-matching network to adjust the reflection coefficient ensuring reception of the self-reflected signal despite changes in the noise levels at the ADC due to changing gains in RF transmit chain and/or receive chain amplifiers and/or interfering signals in the frequency band or bands of interest.

In one implementation, the self-receive hardware includes a directional coupler as the passive coupling device. The directional coupler includes four ports, two for each of the coupled transmission lines. In this implementation, the transmit port and the antenna port are located on the same transmission line in the directional coupler while the receive port is located at the coupled port opposite the antenna, thereby receiving coupled power from the antenna and reflected power from the interface between the directional coupler and the antenna. Alternatively, the self-receive hardware can include a directional coupler wherein the receive port and the antenna port are located on the same transmission line. As a result, the receive port receives direct power from the antenna port and the reflected power from the antenna port. However, in this alternative implementation, the antenna port receives signals from the transmit port at a lower power due to coupling between the two transmission lines. Thus, a higher power at the transmit port results in the same power at the antenna port. However, in an implementation wherein the receive port and the antenna port are coupled to the same transmission line, the self-receive hardware can improve the sensitivity of the transceiver to signals received at the antenna.

In an alternative implementation, the self-receive hardware includes a power divider as the passive coupling device. The power divider divides power from an input port between two output ports. In this implementation, power input at the antenna port is split between the transmit port and the receive port, thus any power reflected at the interface between the antenna and the power divider is also divided between the transmit port and the receive port.

In yet another implementation, the self-receive hardware includes a circulator as the passive coupling device. The circulator can couple the transmit port directly to the antenna port while the antenna port is directly coupled to the receive port. Any reflections generated at the antenna port interface are then coupled back to the receive port.

In one implementation, each node can include a software-defined radio architecture performing the function of any of the hardware elements described above.

However, the self-receive hardware can include any software or hardware system for feeding a Tx signal into an Rx port of a node.

1.4 Gross Time Synchronization

Prior to execution of the method S100, the clocks of each node are coarsely synchronized using another time synchronization protocol. For example, the pair of nodes may be connected to the internet and in communication with one or more NTP servers. Thus, both node clocks may be synchronized to between one and ten milliseconds under some conditions. Alternatively, the nodes can communicate with a global navigation system (hereinafter "GNSS") time synchronization server and may be synchronized to within one microsecond in some cases.

The method S100 leverages existing time synchronization protocols, henceforth referred to as "coarse" time synchronization protocols, such that the nodes are able to communicate with the same synchronization slot in a TDMA described below.

Thus, a remote server can: coarsely synchronize a first node's clock and a second node's clock; schedule transmission of a first synchronization signal within a first synchronization slot of a first frame, the first synchronization slot characterized by a first synchronization slot duration; schedule transmission of a second synchronization signal within a second synchronization slot of the first frame, the second synchronization slot characterized by the first synchronization slot duration; configure the second node to receive the first synchronization signal during the first synchronization slot of the first frame; and configure the first node to receive the second synchronization signal during the second synchronization slot of the first frame.

1.5 Slot and Frame Definition

Figure 4A:
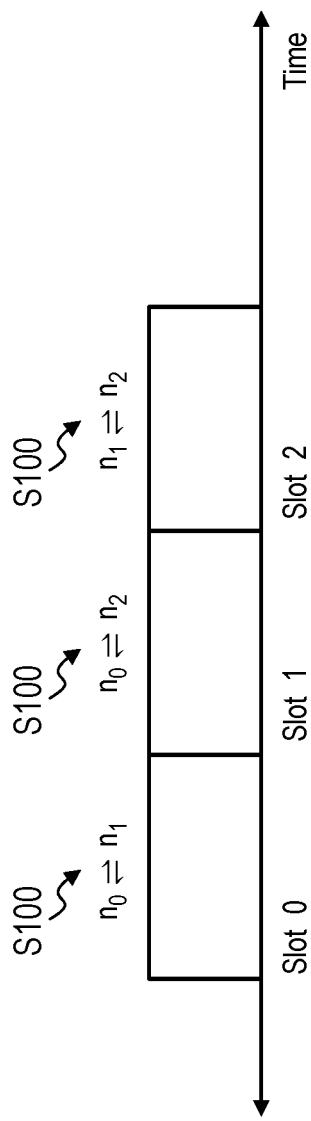
FIGS. 4A and 4B are schematic representations of synchronization slot structures.
Figure 4B:
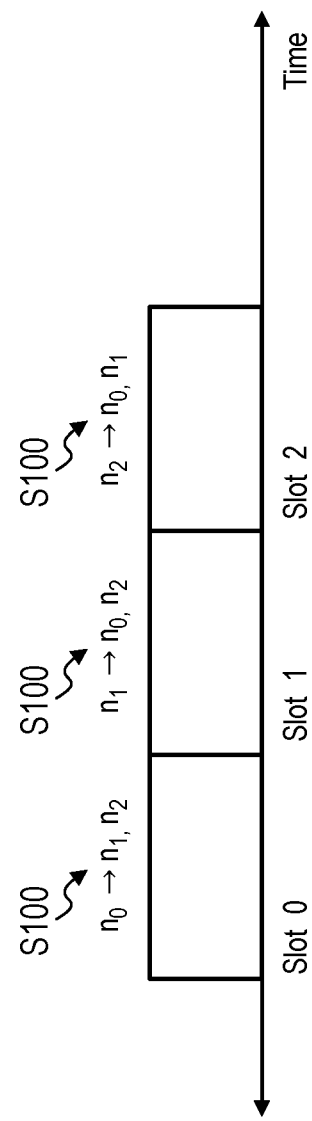

Generally, in the method S100, communication between a pair of nodes occurs according to a slot and frame TDMA structure; examples of which are shown in FIGS. 4A and 4B. The TDMA structure can include one or more slots for both time synchronization via the method S100 and data transfer. In one implementation, shown in FIG. 4A, each TDMA frame includes a synchronization slot to synchronize each unique pair of nodes in the mesh network. For example, a mesh network including three nodes, $n_1$, $n_2$, and $n_3$, can include a first synchronization slot for the synchronization of $n_1$ and $n_2$; a second synchronization slot for $n_1$ and $n_3$; and a third synchronization slot for $n_2$ and $n_3$. Alternatively, as shown in FIG. 4B, the TDMA frame can include a synchronization slot for each node in the mesh network to transmit a synchronization signal to all other nodes in the mesh network. For example, in a mesh network including three nodes, $n_1$, $n_2$, and $n_3$, can include a first synchronization slot for $n_1$ to transmit a synchronization signal to $n_2$ and $n_3$; a second synchronization slot for $n_2$ to transmit a synchronization signal to $n_1$ and $n_3$; and a third synchronization slot for $n_3$ to transmit a synchronization signal to $n_1$ and $n_2$.

In one implementation, (e.g., if the initial synchronization accuracy achieved with NTP is sufficiently low), each synchronization slot is further divided into two subsequent sub-slots to reduce synchronization overhead. For example, in a synchronization for $n_1$ and $n_2$, $n_1$ transmits during the first sub-slot and $n_2$ receives the transmission from $n_1$. Then, in a second sub-slot, $n_2$ transmits and $n_1$ receives.

Each TDMA frame can also include a header indicating the presence and order of synchronization slots and data transfer slots for each node in the mesh network. In one implementation, each TDMA frame includes a set of synchronization slots. Alternatively, each TDMA frame may or may not include a set of synchronization slots according to the header for the TDMA frame. In yet another implementation, a TDMA frame can include multiple sets of synchronization slots. In one implementation, the header can include a coordination signal transmitted by a remote server or master node coordinating the TDMA protocol in order to communicate specific transmission times for synchronization signals to nodes in the mesh network.

The duration of synchronization slots and the buffer time between two synchronization slots corresponding to different pairs of nodes can vary depending on the implementation and factors such as the current known time bias between nodes and associated uncertainty. The method S100 can include adjusting synchronization slot duration based on the output of a predictive drift model, further described below. Furthermore, the synchronization slot duration can have a lower limit equal to a sum of the uncertainty in the time bias between the pair of nodes, the propagation time between the pair of nodes, the uncertainty of the propagation time between the pair of nodes, and the duration of the synchronization signal. In one implementation the slot and the buffer between synchronization slots are both set to one millisecond. Additionally or alternatively, the method S100 can include adjusting the synchronization slot duration as a function of the signal-to-noise ratio of previously received synchronization signals in order to provide additional measurement acquisition time to determine TOA of signals with lower signal-to-noise ratios.

Additionally, the duration of each TDMA frame is subject to a set of practical constraints. The TDMA frame duration can have an upper limit defined by the expected drift of the least stable node clock in the node pair compared to the desired accuracy of the clock synchronization process. For example, if one node clock is known to drift one nanosecond per second due to accumulated jitter and the desired accuracy of the clock synchronization process is one nanosecond, the TDMA frame duration (or time between synchronization slots) can be limited at one second such that the time bias between nodes is not likely to exceed one nanosecond.

Furthermore, the TDMA frame duration has a lower limit based on the sum of the expected initial clock offset between the nodes, the total duration of the synchronization slots, the total duration of any data transfer slots, and the total duration of any time buffers between slots. The frame duration can be sufficiently long for each node to receive the initial synchronization signal from each of the other nodes in the network while accounting for a large initial time bias. Thus, if the nodes are initially synchronized using NTP, the system 100 defines a frame duration of at least tens of milliseconds in order to account for time biases between NTP synchronized clocks.

In one implementation, during initial synchronization of a set of nodes in a mesh network. The set of nodes are configured (e.g., by the remote server) to broadcast a coordination signal at a predetermined time according to the clock of each node. Given initial coarse time synchronization between nodes, the system can designate a master node as the first node to transmit a coordination signal to the other nodes. Each node in the mesh network can then confirm receipt of the master node's confirmation signal, thereby designating the master node to each of the nodes in the mesh network. Thus, a first node in a pair of nodes can receive, from a second node in the pair of nodes, a confirmation of receipt of the coordination signal; and, in response to receiving confirmation of receipt of the coordination signal before the first node receives a second coordination signal from another node in the mesh network, designating the first node as a master node.

In an alternative implementation, the TOA of the coordination signal can be calculated at each node and sent to a remote server, which can then determine the master node in the mesh network. In yet another alternative implementation, the remote server designates the master node or coordinates the TDMA and the method S100 for the set of nodes in the mesh network.

When communicating within a TDMA synchronization slot, each node in a pair of nodes executing the method S100 can transmit synchronization signals and receive both synchronization signals from other nodes and self-receive signals during the synchronization slot. Therefore, in one implementation, the nodes execute a time division duplex (hereinafter "TDD") or a half-duplex scheme to communicate within a synchronization slot. In this implementation, the synchronization signals transmitted by each node in a node pair are separated by a predetermined delay time (e.g., approximately half the synchronization slot duration) such that a first node in a pair of nodes can transmit a first synchronization signal and receive a self-receive signal corresponding to the first synchronization signal during a first division of the synchronization slot and subsequently receive a second synchronization signal (transmitted from a second node in the node pair) in a second division of the synchronization slot. In this implementation, nodes executing the method S100 can transmit a coordination signal including timing information such as slot division durations and timings to other nodes in the mesh network thereby establishing a half-duplex communication link between the two nodes.

In one implementation, the system can implement a full-duplex (i.e., frequency division duplex, hereinafter "FDD") communication scheme whereby each node in a pair of nodes can transmit and receive synchronization signals simultaneously (e.g., wherein each synchronization signal is sent over multiple frequencies). Additionally, each node in a pair of nodes can be configured to simultaneously receive a self-receive signal back-coupled to the receiver of the node and a synchronization signal from a second node in the pair of nodes.

Therefore, in one implementation, a master node in a pair of nodes can transmit the coordination signal to the second node, wherein the coordination signal indicates a second time to transmit the second synchronization signal equal to a first time of transmission of the first synchronization signal; and establish a full-duplex communication link with the second node.

However, in applications wherein a larger bandwidth is available, the nodes can also communicate using frequency division multiple access or any other channel access method.

1.6 Time Bias and Propagation Delay Characterization

As shown in FIG. 1A, each node in a pair of nodes can execute Blocks S110, S120, S130, S140, S150, and S160 to: transmit synchronization signals to each other at a predetermined transmission time that is evaluated according to the clock of each node; back-couple the synchronization signal via the self-receive hardware of the node to form a self-receive signal; and record TOAs for the back-coupled self-receive signal and the synchronization signal received from the opposite node in the pair of nodes. Thus, each node in a pair of nodes calculates two TOAs according to the node's clock. Each node can then send the TOA of the self-receive signal and the TOA of the synchronization signal (e.g., during a data transfer slot in the frame) either to one of the nodes in the pair of nodes or a remote server in order to calculate the time bias between the pair of nodes and the propagation delay between the pair of nodes, in Block S170.

Variations of the method S100 shown in FIGS. 1B and 1C include additional Blocks for coordinating a pair of nodes executing the method S100. In the first variation shown in FIG. 1B, a master node in the pair of nodes executes Blocks S102, S142, S162, and S170 in addition to the previously mentioned Blocks of the method S100 in order to: communicate a transmission time to the slave node; receive a TOA of the self-receive signal calculated by the slave node; receive a TOA of the synchronization signal calculated by the slave node; and calculate, at the master node, a time bias and a propagation delay between the master node and the slave node. Thus, the master node can communicate a transmission time to the slave node such that the master node can receive the synchronization signal transmitted by the slave node during a synchronization slot in the TDMA communication scheme.

In the second variation of the method S100 shown in FIG. 1C, a remote server or other computational device communicating with a pair of nodes executes Blocks of the method S104, S106, S144, S146, S164, S166, and S170 to: schedule a transmission time for each of the pair of nodes; receive TOAs from each of the nodes for a synchronization signal received by each of the pair of nodes, and a self-receive signal received at each of the pair of nodes; and calculate a time bias and a propagation delay between the pair of nodes.

Therefore, in any of the abovementioned variations, various entities included with the system can cooperate to execute a time synchronization protocol between a pair of nodes in a mesh network in order to calculate a time bias and a propagation delay between the pair of nodes. In one implementation, the time biases are tracked by a remote server and accounted for when managing a TDMA communication protocol, when executing multilateration for transmitting RF devices, or when executing any other protocol utilizing a time synchronized mesh network. Alternatively, one of the nodes can function as a master node and track time biases and propagation time between nodes in the mesh network.

In order to synchronize clocks of the pair of nodes relative to each other, each node in the node pair can concurrently or consecutively execute Blocks S110, S120, S130, S140, S150, and S160. For example, a first node in the pair of nodes can execute a first instance of these Blocks of the method S100 in S110A, S120A, S130A, S140A, S150A, and S160A, while a second node in the pair of nodes can execute a second instance of these Blocks in S110B, S120B, S130B, S140B, S150B, and S160B. For the purpose of clarity, description with reference to Blocks S110, S120, S130, S140, S150, or S160 can therefore apply to respective Blocks S110A, S120A, S130A, S140A, S150A, or S160A executed by the first node or respective Blocks S110B, S120B, S130B, S140B, S150B, or S160B executed by the second node.

Depending on the relative time bias between the two nodes, the first node can execute Blocks S110A, S120A, S130A, and S140A at any time relative to the second node executing Blocks S110B, S120B, S130B, and S140B (assuming both nodes are executing during the synchronization slot). However, the first node executes Blocks S150A and S160A to receive and calculate a TOA for a synchronization sent from the second node after the second node executes Blocks S110B, S120B, S130B, and S140B. Likewise, the second node executes Blocks S150B and S160B after the first node executes Blocks S110A, S120A, S130A, and S140A.

1.6.1 Transmission Times

In Blocks S110A and S110B each node in a pair of nodes transmits a synchronization signal at a predetermined or coordinated transmission time within a synchronization slot. In implementations wherein the nodes execute TDD, a first transmission time for Block S110A can be offset from a second transmission time for Block S110B by a transmission interval. Thus, each node in a pair of nodes transmits a synchronization signal at a predetermined transmission time according to each node's own clock. For example, if a first transmission time for a first node is set at 1:00:00, then the first node transmits the synchronization at 1:00:00 according to its own clock. Thus, from a third-party perspective, each node transmits a synchronization signal offset by the time bias between the two nodes and offset by the transmission interval between the transmission times for each node.

Because each node transmits a synchronization signal at a predetermined transmission time, instead of transmitting a synchronization signal in response to receiving a signal from another node, such as is in other two-way ranging protocols, the system executing the method S100 does not require precise characterization of receive chain delay, transmit chain delay, or intervening processing delay for each node in order to accurately calculate the time bias and propagation time between a pair of nodes.

1.6.2 Synchronization Protocol

Generally, each node generates a synchronization signal; concurrently or consecutively transmits the synchronization signal to the other node in a pair of nodes and receives a self-receive signal based on the transmitted synchronization signal; and receives a synchronization signal from the other node in the node pair. For ease of description, the nodes in a node pair will be referred to as $n_1$ and $n_2$. However, $n_1$ and $n_2$ can refer to any two-node pair in a mesh network (e.g., $n_i$ and $n_j$). The method S100 includes calculating the relative time bias between $n_1$ and $n_2$ represented as $(b_1-b_2)$ and the propagation delay $\tau$. Based on the reciprocity theorem of electromagnetism, the propagation delay for a signal transmitted from $n_1$ to $n_2$ is equal to the propagation delay for a signal transmitted from $n_2$ to $n_1$ ($\tau_{1,2}=\tau_{2,1}\equiv\tau$).

In calculating TOA such as in Blocks S140 and S160 the node can cross-correlate a received synchronization signal or self-receive signal with a template signal to determine a timestamp corresponding to the peak value of the autocorrelation function. Synchronization signals can include specifically chosen sequences that have a high autocorrelation value when the sequences are aligned and a low autocorrelation value otherwise. In one implementation, each node performs digital autocorrelation between received signals and template signals. Alternatively, each node performs analog autocorrelation between an analog conversion of the digital synchronization signal and the template signal. The latter accounts for the value of the samples in addition to the time durations between samples. Furthermore, the node can refine the calculated TOA based on phase information extracted from the synchronization signal. In one implementation, the nodes can transmit each synchronization signal over multiple frequency bands to increase the number of carrier phase measurements obtained by the receiving node and therefore increase the accuracy of the TOA calculation.

In Block S110A, at local time $T_1$ (i.e., a first transmission time), $n_1$ generates a digital synchronization signal at the FPGA or DSP. In one implementation, $n_1$ converts the digital synchronization signal to an analog synchronization signal for transmission via the antenna and propagates the converted synchronization signal along the transmit chain of $n_1$, thereby incurring a transmit chain delay, $t_1$. The analog signal then interacts with the self-receive hardware, which reflects or otherwise back-couples the synchronization signal into the Rx port of $n_1$ as shown in Block S120A. The self-receive signal (i.e., reflected or otherwise back-coupled) synchronization signal is substantially similar to the synchronization signal though the power of the two signals may differ. In one implementation, the power of the self-receive signal ensures the self-receive signal does not saturate the ADC of $n_1$.

In Block S130A, $n_1$ receives the self-receive signal as it the synchronization signal. While the self-receive signal propagates through the receive chain of $n_1$ it incurs receive chain delay, $r_1$. In Block S140A, $n_1$ calculates a local TOA of its self-receive signal, $S_{1,1}$, which is related to the unknown parameters of interest via the following equation:

$$S_{1,1}=T_1+t_1+r_1.$$

Thus, $S_{1,1}$ represents the TOA of the self-receive signal from $n_1$ according to the clock of $n_1$.

As shown in FIG. 5A, and in Blocks S110B, S120B, S130B, and S140B, $n_2$ executes the equivalent steps to those executed by $n_1$ in Blocks S110A, S120A, S130A, and S140A, thereby transmitting a second synchronization signal and calculating a TOA of the self-receive signal generated by $n_2$:

$$S_{2,2}=T_2+t_2+r_2,$$

where $T_2$ is a local time at $n_2$ (i.e., the second transmission time), $t_2$ is that transmit chain delay of $n_2$, and $r_2$ is the receive chain delay of $n_2$. In implementations wherein the transmission times for each of the nodes is offset a transmission interval, $\Delta$, $T_2=T_1+\Delta$ Thus, $S_{2,2}$ represents the measured TOA of the self-receive signal from $n_2$ according to the clock of $n_2$.

As shown in FIG. 5B, and in Block S150A, $n_1$ receives the synchronization signal from $n_2$, which propagates through the receive chain of $n_1$ incurring receive chain delay, $r_1$. In Block S160A, $n_1$ then calculates a local TOA for the synchronization signal received from $n_2$, $S_{1,2}$, which is expressed in the following equation:

$$S_{1,2}=T_2-b_2+t_2+\tau+r_1+b_1.$$

Thus, $S_{1,2}$ represents the measured TOA of the synchronization signal from $n_2$ according to the clock of $n_1$.

In Blocks S150B and S160B, $n_2$ executes the equivalent steps to those executed by $n_1$ in Blocks S150A and S160A, thereby receiving a synchronization signal from $n_1$ and calculating a local TOA (at $n_2$) for the synchronization signal, $S_{2,1}$, expressed as follows:

$$S_{2,1}=T_1-b_1+t_1+\tau+r_2+b_2.$$

Thus, $S_{2,1}$ represents the measured TOA of the synchronization signal from $n_1$ according to the clock of $n_2$.

In Block S170, one of the nodes (e.g., a master node in the pair of nodes), either $n_1$ or $n_2$, or another computational device such as a remote server or a separate master node, collects the above TOAs, $S_{1,1}$, $S_{1,2}$, $S_{2,2}$, and $S_{2,1}$, to calculate $\tau$ and $b_1-b_2+r_1-r_2$, or the relative time bias plus the difference in receiver chain delay. Taking differences between the self-receive signal and the corresponding synchronization signal received at opposite nodes the following is derived:

$$S_{1,2}-S_{2,2}=\tau+r_1+b_1-r_2-b_2,$$

$$S_{2,1}-S_{1,1}=\tau+r_2+b_2-r_1-b_1.$$

Thus $\tau$ is calculated as:

$$\tau = \frac{1}{2}[(S_{1,2} - S_{2,2}) + (S_{2,1} - S_{1,1})]$$

and $b_1-b_2+r_1-r_2$ is calculated as:

$$b_1 - b_2 + r_1 - r_2 = \frac{1}{2}[(S_{1,2} - S_{2,2}) - (S_{2,1} - S_{1,1})].$$

Although a value for the pure relative time bias, $b_1-b_2$, cannot be calculated without the value of $r_1-r_2$, adjusting the clock of one node in the pair of nodes by $b_1-b_2+r_1-r_2$ ensures that any signal received by both nodes at the same time will receive the same timestamp at each node even if the instantaneous time at each clock differs by $r_1-r_2$ because the difference in receive chain delay will compensate for the post inaccuracy in the time bias. Alternatively, if $r_1-r_2 \cong 0$, then:

$$b_1 - b_2 \cong \frac{1}{2}[(S_{1,2} - S_{2,2}) - (S_{2,1} - S_{1,1})].$$

Once $\tau$ and $b_1-b_2+r_1-r_2$ have been calculated, the method S100 can also include synchronizing the time between $n_1$ and $n_2$ by adding $b_1-b_2+r_1-r_2$ to the clock of $n_1$ or $n_2$ to compensate for the initial time bias. In implementations with multiple nodes in the mesh network, one node is designated as a "master node" while the other nodes are designated "slave nodes." Thus, in this implementation, the method S100 includes adjusting the clocks of the slave nodes to match the master node. Alternatively, a master node or remote server in the system can track the relative time bias of each node pair in a mesh network and compensate for the calculated time biases when executing processes that rely on precise time synchronization between nodes in the mesh network, such as time-based communication protocols or multilateration of other RF devices.

In one implementation, each node in the mesh network can average measurements to calculate a time bias and propagation delay when these variables are over-defined. For example, in a network including nodes $n_1$, $n_2$, and $n_3$, the time bias between $n_1$ and $n_2$ can also be calculated as follows:

$$b_1 - b_2 \cong \frac{1}{2}[(S_{1,3} - S_{3,3}) - (S_{3,1} - S_{1,1})] - \frac{1}{2}[(S_{2,3} - S_{3,3}) - (S_{3,2} - S_{2,2})].$$

Additionally, the method S100 can include indirectly calculating a time bias between nodes that do not have a direct communication line (e.g., due to an obstruction of communication between the two nodes). For example, in a network including nodes $n_1$, $n_2$, and $n_3$, the time bias between $n_1$ and $n_3$ can also be calculated as follows:

$$b_1 - b_3 \cong \frac{1}{2}[(S_{1,2} - S_{2,2}) - (S_{2,1} - S_{1,1})] + \frac{1}{2}[(S_{2,3} - S_{3,3}) - (S_{3,2} - S_{2,2})].$$

Thus, $n_2$ and $n_3$ can execute another iteration of the method S100 and the system can calculate a time bias between the first clock of $n_1$ and the third clock of $n_3$ based on a sum of the first time bias ($b_1-b_2$) and the second time bias ($b_2-b_3$).

Furthermore, the method S100 can include calculating an instantaneous uncertainty in the relative time bias between nodes, $\delta(b_1-b_2)$ and an instantaneous uncertainty in the propagation delay $\delta\tau$. Sources of uncertainty can include the propagated uncertainty based on the peak width of the autocorrelation function for each TOA calculation plus any expected phase noise that may occur at the clocks of each node between synchronization slots.

1.6.3 Phase Refinement

In addition to calculating the time bias and propagation time between nodes based on the synchronization protocol described above, the system can also refine the propagation time $\tau$ by extracting carrier phase information from each of the four received signals, the first self-receive signal received at $n_1$, the first synchronization signal received at $n_2$, the second self-receive signal received at $n_2$, and the second synchronization signal received at $n_1$. Upon receiving the first self-receive signal $n_1$ detects a carrier phase of the first self-receive signal, which is represented as follows:

$$\angle_{1,1}=(2\pi f_c T_1+\phi_{1,Rx}) \mod 2\pi,$$

where $f_c$ is the carrier frequency and $\phi_{1,Rx}$ is the phase delay induced by the receive chain of $n_1$. Likewise, $n_2$ detects a carrier phase of the second self-receive signal, which is represented as follows:

$$\angle_{2,2}=(2\pi f_c T_2+\phi_{2,Rx}) \mod 2\pi,$$

where $f_c$ is the carrier frequency and $\phi_{1,Rx}$ is the phase delay induced by the receive chain of $n_1$. Additionally, $n_1$ can detect the carrier phase of the synchronization signal received from $n_2$, which is represented as follows:

$$\angle_{1,2}=(2\pi f_c(T_2+\tau)+\phi_{2,Rx}) \bmod 2\pi.$$

Likewise, $n_2$ can detect the carrier phase of the synchronization signal received form $n_1$, which is represented as follows:

$$\angle_{2,1}=(2\pi f_c(T_1+\tau)+\phi_{2,Rx}) \bmod 2\pi.$$

To refine the calculation of $\tau$, the above relations can be rearranged as follows:

$$\angle_{2,1}-\angle_{1,1}=(2\pi f_c(T_1+\tau)+\phi_{2,Rx}-2\pi f_c T_1-\phi_{1,Rx}) \bmod 2\pi =$$
$$(\phi_{2,Rx}+2\pi f_c\tau-\phi_{1,Rx}) \bmod 2\pi,$$

$$\angle_{1,2}-\angle_{2,2}=(2\pi f_c(T_2+\tau)+\phi_{1,Rx}+2\pi f_c T_2-\phi_{2,Rx}) \bmod 2\pi =$$
$$(\phi_{1,Rx}+2\pi f_c\tau-\phi_{2,Rx}) \bmod 2\pi.$$

Thus, the system can refine the value of $\tau$, based on the synchronization protocol described above by calculating:

$$(\angle_{2,1} - \angle_{1,1}) + (\angle_{1,2} - \angle_{2,2}) = (4\pi f_c \tau) \bmod 2\pi,$$

$$\tau \in \left\{ \frac{(\angle_{2,1} - \angle_{1,1}) + (\angle_{1,2} - \angle_{2,2}) + n2\pi}{4\pi f_c} : n \in \mathbb{Z} \right\}.$$

Once several measurements are obtained for a range of carrier frequencies, $f_c$, the system can statistically solve the set of equations (e.g., via a least-squares calculation or other numerical methods) to refine the propagation time $\tau$.

Thus, in one implementation, a remote server or master node executing Blocks of the method S100 can, after transmission of the synchronization signal by $n_1$ at $T_1$ according to a clock of receive, from $n_1$, a phase of a first self-receive signal according to $n_1$; and receive, from $n_2$, a phase of the synchronization signal from $n_1$ according to $n_2$; and, after transmission of the synchronization signal by $n_2$ at $T_2$ according to a clock of $n_2$: receive, from $n_2$, a phase of a second self-receive signal according to the clock of $n_2$; and receive, from $n_1$, a phase of the synchronization signal from $n_2$ according to the clock of $n_1$. The remote server or master node can then refine the first propagation delay based on the phase of the first self-receive signal, the phase of the first synchronization signal, the phase of the second self-receive signal, and the phase of the second synchronization signal.

1.6.4 Clock Adjustment

Figure 2:
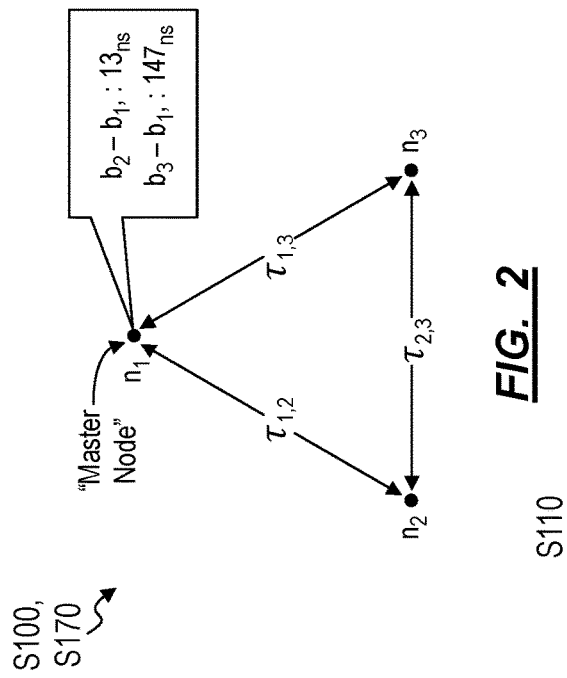
FIG. 2 is a schematic representation of a mesh network.

Once the system has executed the synchronization protocol and/or phase refinement for a pair of nodes, the system can shift the clock of one node in each pair of nodes by the calculated time bias in order to synchronize the clocks of the pair of nodes. Alternatively, as shown in FIG. 2 the system can maintain the time bias of each node relative to a master node or other time standard (e.g., the clock of a remote server) and correct scheduling times sent to each node and/or timestamps received from each node based on the latest calculated time bias of the node relative to the master node or time standard—such as by subtracting the time bias of the node from any timestamps calculated by the node.

2. Second Method

Figure 6A:
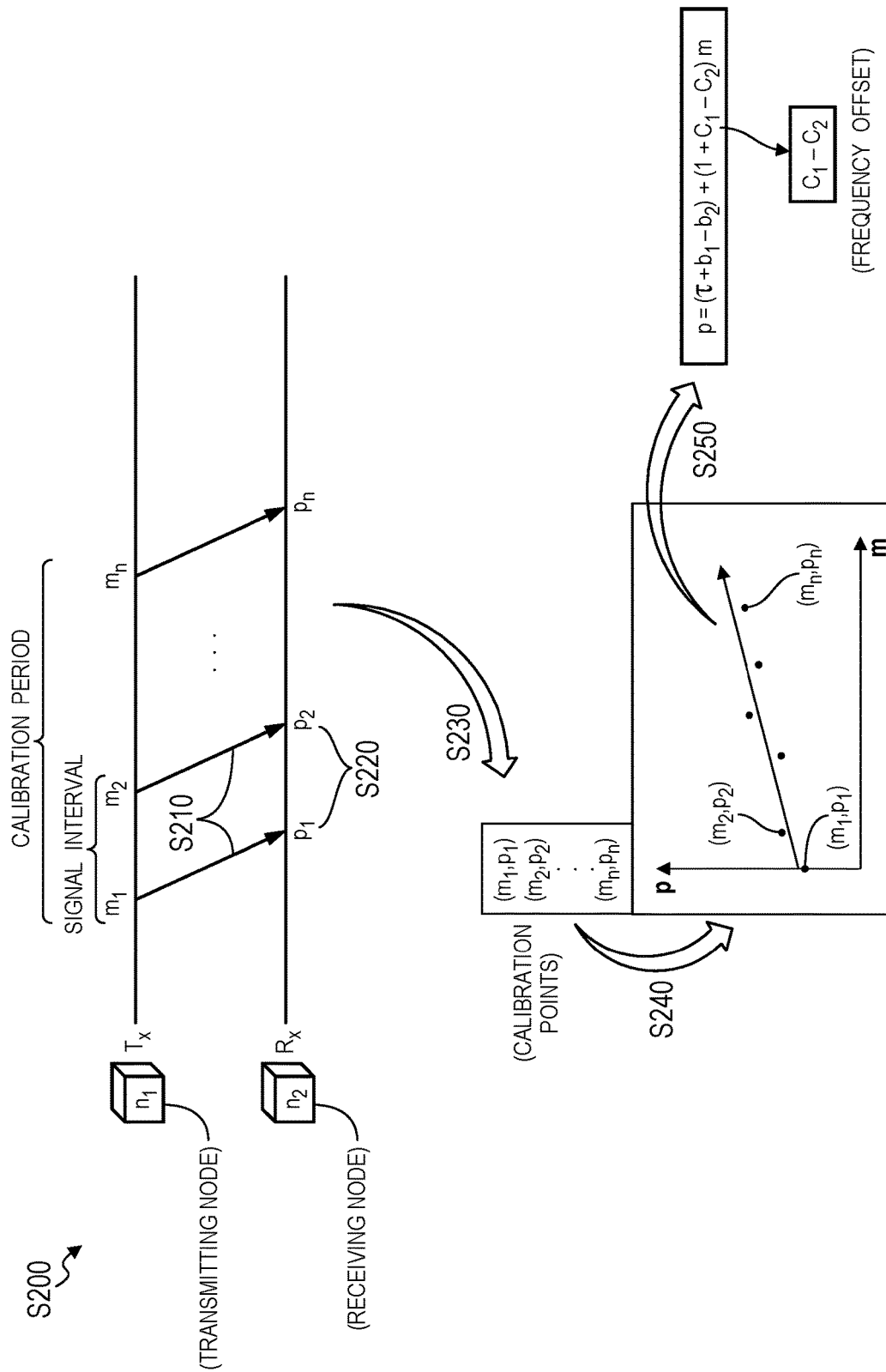
FIGS. 6A and 6B are flowchart representations of a second method.

As shown in FIG. 6A, a second method S200 for calculating a frequency offset between two clocks includes, at a first node: transmitting a first calibration signal at a first time-of-departure measured by a first clock of the first node; and transmitting a second calibration signal at a second time-of-departure measured by the first clock and succeeding the first time-of-departure by an initial signal interval in Block S210. The second method S200 also includes, at a second node: receiving the first calibration signal at a first time-of-arrival measured by a second clock of the second node; and receiving the second calibration signal at a second time-of-arrival measured by the second clock in Block S220. The second method S200 further includes: defining a first calibration point in a first set of calibration points, the first calibration point representing the first time-of-departure and the first time-of-arrival; defining a second calibration point in the first set of calibration points, the second calibration point representing the second time-of-departure and the second time-of-arrival in Block S230; calculating a first regression on the first set of calibration points in Block S240; and calculating a first frequency offset between the first clock and the second clock based on the first regression in Block S250.

Figure 6B:
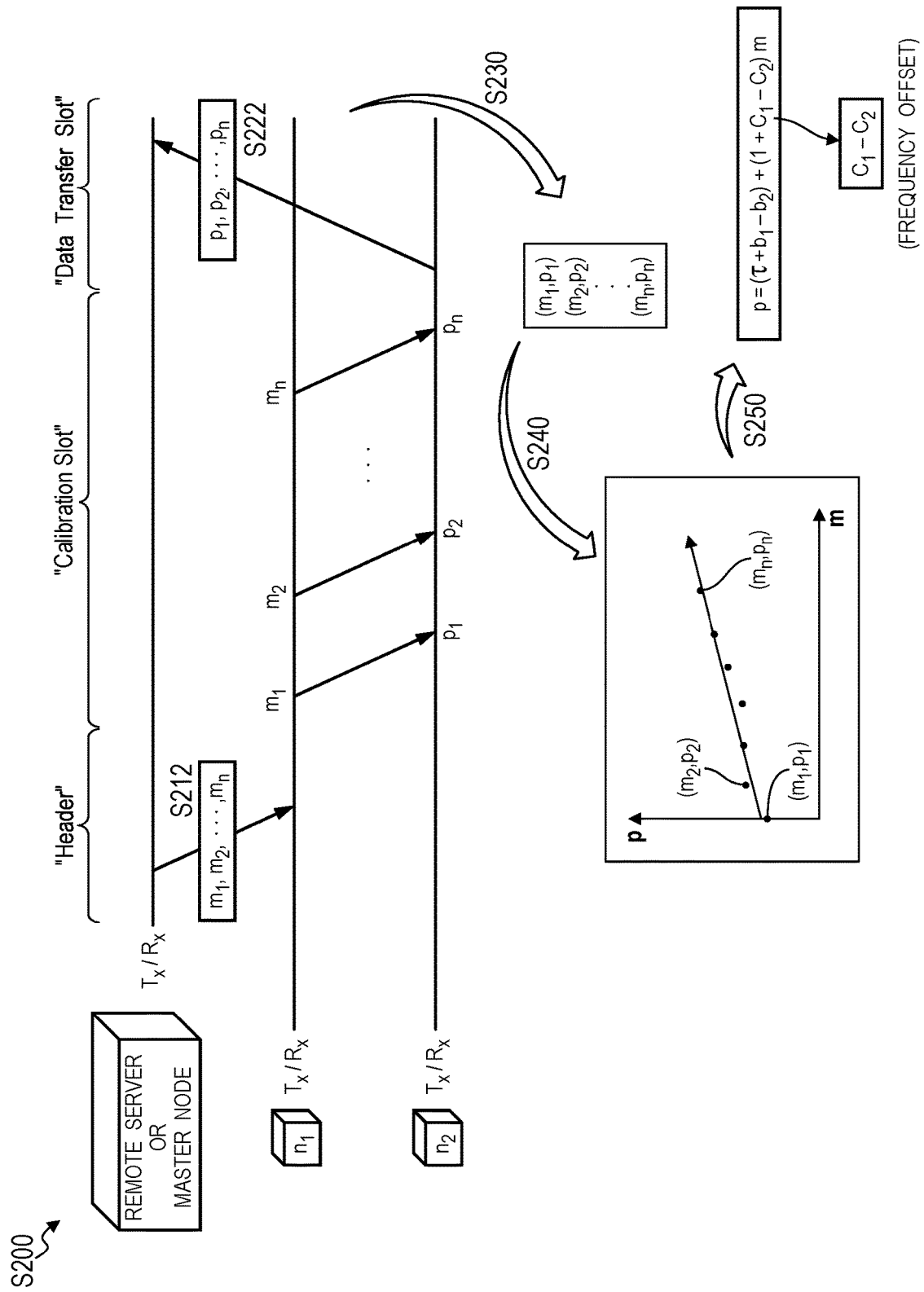

As shown in FIG. 6B, one variation of the second method S200 includes: scheduling transmission, from a first node, of a first calibration signal at a first time-of-departure measured by a first clock of the first node; scheduling transmission, from the first node, of a second calibration signal at a second time-of-departure measured by the first clock and succeeding the first time-of-departure by an initial signal interval in Block S212; receiving, from a second node, a first time-of-arrival measured by a second clock of the second node, the first time-of-arrival corresponding to reception of the first calibration signal at the second node; receiving, from the second node, a second time-of-arrival measured by the second clock, the second time-of-arrival corresponding to reception of the second calibration signal at the second node in Block S222; defining a first calibration point in a first set of calibration points, the first calibration point representing the first time-of-departure and the first time-of-arrival; defining a second calibration point in the first set of calibration points, the second calibration point representing the second time-of-departure and the second time-of-arrival in Block S230; calculating a first regression on the first set of calibration points in Block S240; and calculating a first frequency offset between the first clock and the second clock based on the first regression in Block S250.

2.1 Applications

Generally, the second method S200 is executable by a set of (e.g., two) nodes in a mesh network and/or a remote server (hereinafter "the system" as shown in FIG. 11) to calculate a frequency offset between clocks of these nodes and to compensate for this frequency offset in communications between these nodes. In particular, a pair of nodes can execute the second method S200 to detect and compensate for a frequency offset between their clocks (e.g., by adjusting a trim capacitor or digital correction), such as between two crystal oscillator clocks or between a crystal oscillator clock and an atomic clock. Upon compensating for the frequency offset between the clocks of the pair of nodes, the pair of nodes can then execute the first method S100 described above to temporally synchronize their clocks in order to characterize the absolute time bias between the clocks of the pair of nodes. Furthermore, the second method S200 can be executed between nodes with only a coarse level of time synchronization between them (e.g., a time synchronization on the order of 1-100 milliseconds). Thus, a pair of coarsely synchronized nodes can execute the second method S200, to first compensate for frequency drift between the pair of nodes, and subsequently execute the first method S100 in order to characterize the time domain drift between the frequency synchronized clocks of the pair of nodes to within one nanosecond.

For example, frequency offsets between crystal oscillators may occur within a range of hundreds of parts-per-billion (hereinafter "PPB") to hundreds of parts-per-million (hereinafter "PPM"). In order to accurately calculate a time bias between two clocks, such as via the first method S100, the system can first characterize the frequency offset between these clocks in order to preserve the accuracy of this time bias even as these clocks drift relative to each other over time due to this frequency offset. Therefore, the system can execute the second method S200 to calculate the frequency offset between the clocks of two nodes—such as to within ten PPB—in order to support higher-precision calculation of a time bias between these nodes, such as during execution of the first method S100. Thus, the system can execute the second method S200 in conjunction with the first method S100 in order to achieve high-resolution (e.g., nanosecond-level) time synchronization between two nodes.

In one example, the system can: wirelessly connect a pair of nodes in a mesh network to attain a rough level of time synchronization (e.g., to within a few milliseconds; execute the method S200 to attain frequency compensation between the pair of nodes to with ten PPB; execute method S100 to attain a time synchronization between the pair of nodes to within one nanosecond. The system can then implement TOA or time-difference-of-arrival multilateration to locate transmitters to within 30 centimeters. Additionally or alternatively, the system can execute high-speed TDMA communication protocols between the pair of nodes with minimal slot and/or frame buffers.

Generally, the second method S200 is described herein as executed between two nodes (or a "pair" of nodes). However, the method S200 can additionally or alternatively be executed between any other quantity of nodes and/or a master node concurrently or sequentially.

2.2 Summary

In the second method S200, a first node (i.e., the "transmitting node") in the mesh network transmits successive calibration signals separated by a calibration signal interval (hereinafter a "signal interval") during a period of time between a first calibration signal and a last calibration signal (hereinafter a "calibration period"). The transmitting node also records a time-of-departure (hereinafter "TOD") of each calibration signal such that the system can later compare the TOD of each calibration signal as measured by a clock of the transmitting node to the TOA of each calibration signal as measured by a clock of the receiving node.

In one implementation, the transmitting node transmits calibration signals similar in structure to the synchronization signals described above with respect to the first method S100. Alternatively, when executing the first method S100 and the second method S200 concurrently, the system can handle a single RF signal as both a synchronization signal and a calibration signal according to the first method S100 and the second method S200, respectively.

The transmitting node also transmits calibration signals successively during a calibration slot in a TDMA frame—described above—according to the second method S200. In particular, the transmitting node delays each successive calibration signal by a signal interval measured by a clock of the transmitting node. For example, for a signal interval of one second, the transmitting node can begin transmission of the first calibration signal one second before the beginning transmission the second calibration signal.

The system can adapt a duration of the signal interval according to the hardware of the transmitting node and/or receiving node based on a predicted initial offset between the clocks of a pair of nodes; a nominal initial clock frequency of each node, and a desired accuracy for the frequency offset calculation. For example, by decreasing the duration of the signal interval, the system can increase a number of calibration signals transmitted between these nodes within a single calibration period, thereby improving accuracy of a regression on calibration points based on the TODs and TOAs of these calibration signals.

Additionally, the system can adapt a duration of the calibration period (during which all calibration signals are sent) according to an expected maximum frequency offset between nodes, a desired precision of the frequency offset calculation (e.g., measured in PPM or PPB), and/or the expected maximum timestamping noise of the receiving node.

The receiving node in the pair of nodes receives each successive calibration signal and determines the TOA of each calibration signal to within one sampling period (e.g. based on the sample time counter of the clock)—such as based on digital timestamping. For example, if the nominal sampling frequency of a node clock is ten megahertz, the TOA can be determined to within the sampling period of 100 nanoseconds.

Also, because the clock of the receiving node and the clock of the transmitting node may operate at different frequencies, the accuracy of the TOA of each calibration signal—such as calculated by the receiving node—may be reduced to within one sampling period (e.g. to within 100 nanoseconds for a clock with a sampling frequency of ten megahertz) when compared to the TOA calculation for the synchronization signal in the first method S100. Therefore, the receiving node can calculate TOAs for multiple calibration points corresponding to multiple calibration signals such that the system can calculate a frequency offset between clocks of the transmit and receive nodes based on a cumulative plot of successive calibration points.

The system can then define and plot a set of calibration points, wherein each calibration point includes a TOD of a calibration signal from the transmitting node and a TOA of the same signal measured by the receiving node. The system can execute a linear regression on the set of calibration points and extract the frequency offset between the two nodes from the slope of the best-fit line of the linear regression.

In another implementation, the system can calculate the time elapsed between TOAs of successive calibration signals according to the clock of the receiving node and calculate a difference between the elapsed time and the signal interval. The system can then record the calculated difference as a signal interval deviation, which the system can leverage to determine a frequency offset between clocks in the nodes (e.g., based on an average or weighted average of signal interval deviations).

By calculating a regression on calibration points consisting of TODs versus TOAs of each calibration signal, the system can estimate frequency offsets to a high degree of accuracy despite various sources of timestamping noise at each node. Timestamps measured at the receiving node may be affected by: frequency domain drift due to the frequency offset between clocks in the nodes; time domain drift due to phase noise accumulation during the signal interval; time domain drift due to changing environmental factors during the signal interval; RF interference at the receiving node; and/or scheduling delays in the process of the receiving node. Thus, the system defines multiple calibration points over a calibration period in order to characterize timestamping noise between the pair of nodes and calculate an accurate estimate of the frequency offset despite timestamping noise in the pair of nodes.

After the receiving node and/or the remote server executing the second method S200 calculates the frequency offset, the receiving node and/or the remote server can apply frequency compensation equal to the measured frequency offset to the clock of one of the nodes (e.g. the slave node to bring the slave node into frequency calibration with a master node). Alternatively, a remote server communicating with nodes in the mesh network executing the method S200 can schedule successive TDMA slots in a time synchronization, frequency calibration, data communication, and/or localization protocol executed by the mesh network while compensating for the calculated frequency offset between the nodes.

In one implementation, the frequency calibration process occurs on a pairwise basis across a network of nodes calibrating the frequency of each node clock based on the clock frequency of a master node. Alternatively, the master node can transmit the successive calibration signals to multiple nodes in the network at the same time and each of the receiving nodes can be calibrated to the master node concurrently.

2.3 Frequency Calibration Parameters

The system executing the second method S200, as shown in FIG. 6A, can characterize the frequency offset between the clocks of a set of nodes in the mesh network. The frequency calibration process of the second method S200 includes a set of configurable or adaptable attributes including: the calibration transmission pattern, the calibration period, the signal interval, and recalibration triggers.

Generally, during execution of the second method S200, a transmitting node executes Block S210 by transmitting a series of calibration signals to a set of receiving nodes. More specifically, the transmitting node can: transmit a first calibration signal at a first TOD measured by a clock of the transmitting node; and transmit a second calibration signal at a second TOD measured by the clock of the transmitting node and succeeding the first TOD by an initial signal interval. Additionally, in Block S212, the system (i.e., a remote server coordinating the method S200) can schedule the transmission of calibration signals at specific TODs. More specifically, the system can: schedule transmission, from the transmitting node, of the first calibration signal at the first TOD measured by the clock of the transmitting node; and schedule transmission, from the transmitting node, of the second calibration signal at a second TOD measured by the clock of the transmitting node and succeeding the first TOD by the initial signal interval.

The set of receiving nodes can then receive the transmitted series of calibration signals in Block S220. More specifically, a receiving node can: receive the first calibration signal at a first TOA measured by a clock of the receiving node; and receive the second calibration signal at a second TOA measured by the clock of the receiving node. Additionally, the receiving node can report the measured TOAs of the calibration signals to the system such that the system can define a set of calibration points based on the TODs of the calibration signals at the transmitting node and the TOAs of the calibration signals at the receiving nodes. Therefore, in Block S222, the system (i.e., a remote server coordinating the method S200) can: receive, from a receiving node, the first TOA measured by a clock of the receiving node, the first TOA corresponding to reception of the first calibration signal at the receiving node; and receive, from the receiving node, a second TOA measured by the clock of the receiving node, the second TOA corresponding to reception of the second calibration signal at the receiving node.

The system, can include: a transmitting node, a receiving node, a master node (which can be either the transmitting node or the receiving node); and/or a set of remote servers connected to the transmitting node and receiving node. The system can then execute Blocks S230, S240, and S250 in order to calculate a frequency offset between the transmitting node and the set of receiving nodes. More specifically, the system can: define a first calibration point in a set of calibration points, the first calibration point including the first TOD and the first TOA (i.e., the TOD and TOA corresponding to the first calibration signal); define a second calibration point in the set of calibration points, the second calibration point including the second TOD and the second TOA (i.e., the TOD and TOA corresponding to the second calibration signal); calculate a regression on the first set of calibration points; and calculate a frequency offset between the clock of the transmitting node and the clock of the receiving node based on the regression. Additionally, the system can define additional calibration points in the set of calibration points beyond the two described above, wherein each additional calibration point includes a TOD and a TOA of a calibration signal transmitted from the transmitting node to the receiving node.

In one implementation, the transmitting node is a master node, while the receiving node is a slave node. Thus, the second method S200 calculates the frequency offset of the receiving node relative to the transmitting node.

Hereinafter, the method S200 is described with respect to a single transmitting node and a single receiving node for ease of description. However, functions of the single receiving node can be executed by each receiving node in the set of receiving nodes.

A "calibration transmission pattern" refers to the particular pattern (i.e., the timing of calibration signals transmitted by a transmitting node) with which a transmitting node transmits calibration signals during a calibration period A "calibration period" refers to a time period between a first calibration signal transmitted by a transmitting node and a last calibration signal transmitted by the transmitting node for a given frequency offset calculation.

A "signal interval" refers to a time interval between transmitted calibration signals as measured by the clock of the transmitting node. Therefore, the signal interval can vary depending on the calibration transmission pattern of each iteration of the method S200.

"Recalibration triggers" refer to factors that can trigger a frequency calibration process after the completion of an initial frequency calibration between two nodes.

Additionally, before initiating the second method S200, the nominal sampling frequency of both the master node and the slave node may be known (at either the master node or a remote server executing the second method S200). Furthermore, the initial frequency offset is assumed to be bounded within an error value specified by the clocks included in each node. The second method S200 includes steps that leverage this information to set parameters such as the calibration transmission pattern and the signal interval duration.

2.4 Calibration Transmission Pattern

Figure 7:
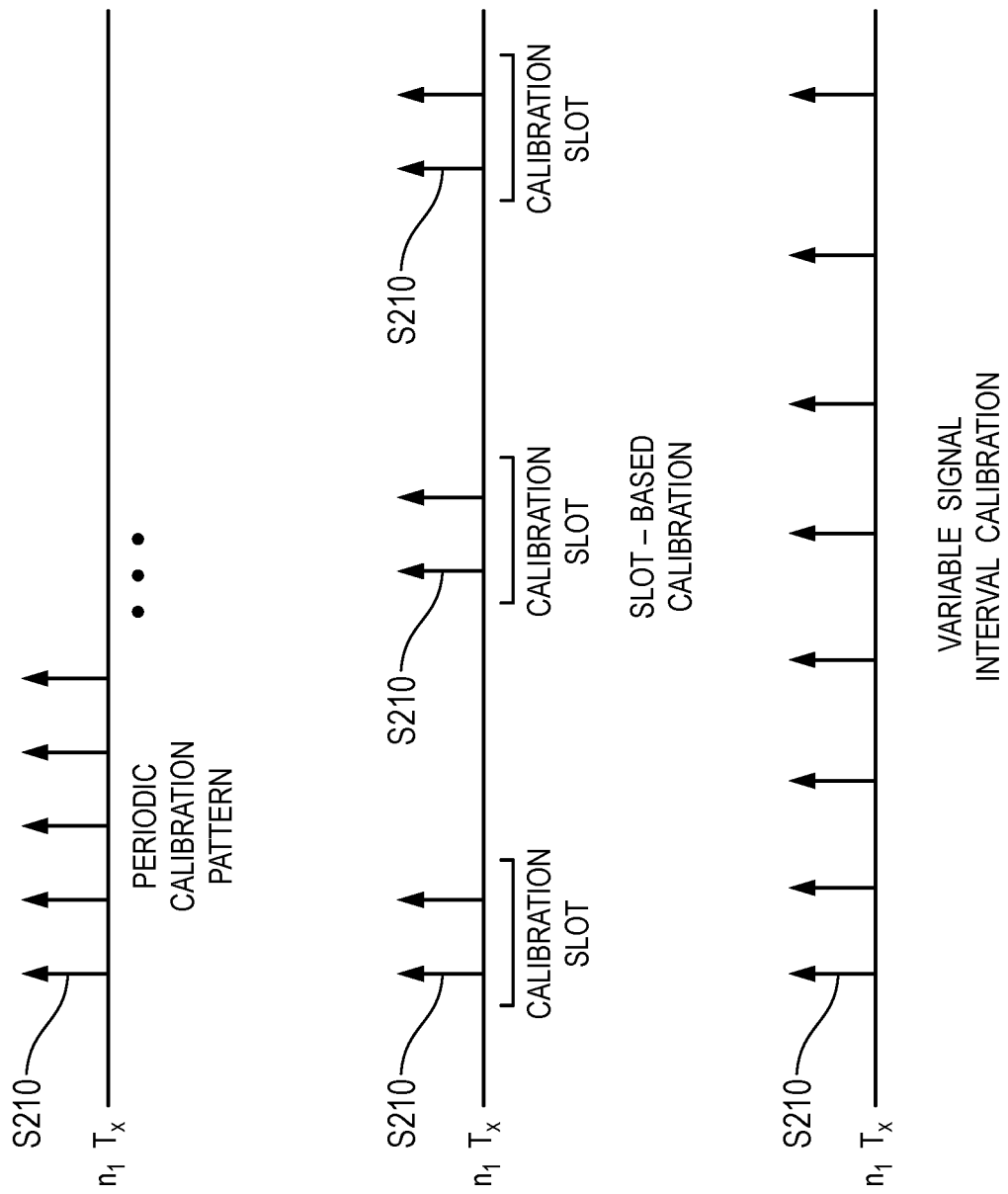
FIG. 7 is a flowchart representation of the second method.

In Block S210, and as shown in FIG. 7, a first node (i.e., a transmitting node) transmits a set of successive calibration signals spanning a calibration period, starting at a first time and separated by signal intervals as measured by a clock of the first node. The system can execute the method S200 according to calibration transmission patterns that can include: a continuous succession of calibration signals separated by a consistent signal interval; a series of calibration signals with a varying intervening signal interval; and/or multiple groups of calibration signals grouped in successive calibration slots separated by intervening slots of a TDMA protocol.

In one implementation, the transmitting node executing the second method S200 transmits a succession of calibration signals separated by a consistent signal interval. For example, the transmitting node can transmit a set of calibration signals with a signal interval of one second and therefore transmits a calibration signal each second during the calibration period according to the clock of the transmitting node.

In another implementation, the transmitting node executing Blocks of the second method S200 utilizes a calibration transmission pattern that includes multiple sets of calibration signals, each set of calibration signals separated by a signal interval followed by successive sets of calibration signals also separated by a signal interval. Each successive set is separated by a slot interval between calibration slots defined by a TDMA protocol implemented by the system. Therefore, the transmitting node can transmit any of the calibration signals of the transmission signal in separate calibration slots. In this implementation, the transmitting node transmits a set of calibration signals and separates each set by a slot interval. The purpose of this calibration pattern is to align calibration signals with calibration slots specified in a TDMA frame, such that the first set of calibration signals are transmitted and received during a first calibration slot in a first TDMA frame and the second set of calibration signals are transmitted and received in a second calibration slot in a second TDMA frame. Furthermore, by transmitting clusters of calibration signals within calibration slots, the system can increase the calibration period while without occupying the time bandwidth for the entire calibration period. Thus, the transmitting node can set the slot interval equal to the time between calibration slots in subsequent TDMA frames, thereby enabling the transmitting and receiving nodes to execute other processes during the intervening period between calibration slots. More specifically, the system can schedule a data transfer slot for the transmitting node between a first TOD (during a first calibration slot) and the second TOD (during a second calibration slot), the data transfer slot characterized by a slot duration less than the initial signal interval by at least a duration of a calibration signal. Additionally or alternatively, the system can schedule a synchronization slot (for execution of the first method S100) for the transmitting node and the receiving node between a first TOD and a second TOD, the synchronization slot characterized by a slot duration less than the initial signal interval by at least a duration of a calibration signal.

More specifically, the system can: schedule a time synchronization slot for the transmitting node and the receiving node between the first TOD and the second TOD; schedule transmission, from the first node, of a first synchronization signal during the time synchronization slot; receive, from the transmitting node, a third TOA measured by the clock of the transmitting node, the third TOA corresponding to reception, at the transmitting node, of a first self-receive signal generated by the transmitting node as a back-coupled reflection of the first synchronization signal; receive, from the transmitting node, a fourth TOA measured by the clock of the transmitting node, the fourth TOA corresponding to reception, at the transmitting node, of a second synchronization signal transmitted by the receiving node; schedule transmission, from the receiving node, of the second synchronization signal during the time synchronization slot; receive, from the receiving node, a fifth TOA measured by the clock of the receiving node, the fifth TOA corresponding to reception, at the receiving node, of a second self-receive signal generated by the receiving node as a back-coupled reflection of the second synchronization signal; receive, from the receiving node, a sixth TOA measured by the clock of the receiving node, the sixth TOA corresponding to reception, at the receiving node, of the first synchronization signal transmitted by the transmitting node; and calculate a time bias and a propagation delay between the first clock and the second clock based on the third TOA, the fourth TOA, the fifth TOA, and the sixth TOA. Thus, the system can execute the first method S100 in order to calculate a time bias and propagation delay between the transmitting node and the receiving node in a time synchronization slot scheduled between calibration slots of the second method S200.

In another implementation, the transmitting node utilizes a calibration transmission pattern including a variable signal interval. In this implementation, the transmitting node can transmit a first set of two calibration signals separated by a first signal interval followed by a second set of two calibration signals separated by a second signal interval greater than the first interval. In this manner, the transmitting node sweeps through a series of signal intervals by transmitting successive sets of two calibration signals. The receiving node or remote server executing blocks of the second method S200 can calculate deviations in the received signal intervals from the expected variable signal interval. The transmitting node executing the second method S200 can execute increasingly narrow sweeps to improve the estimate of the frequency offset.

However, the transmitting node executing Blocks of the second method S200 can transmit calibration signals in a pattern including any combination of the aforementioned patterns.

Furthermore, the system can coordinate the timing of calibration signals, calibration slots, data transfer slots, time synchronization slots, and/or any other TDMA slot within multiple TDMA frames by leveraging a rough time bias calculation between the transmitting node and the receiving node. More specifically, the system can: calculate a rough time bias between the transmitting node and the receiving node; schedule transmission, from the transmitting node, of the first calibration signal at the first TOD during a transmission slot at the transmitting node; schedule transmission, from the transmitting node, of the second calibration signal at the second TOD during the transmission slot at the transmitting node; and schedule, at the receiving node, a reception slot spanning the first TOA and the second TOA, based on the rough time bias.

In one implementation, the system can execute the second method S200 to characterize a frequency offset between the transmitting node and multiple receiving nodes utilizing the same set of calibration signals. More specifically, the system can: receive, from a second receiving node, a third TOA measured by a clock of the second receiving node, the third TOA corresponding to reception of the first calibration signal at the second receiving node; receive, from the second receiving node, a fourth TOA measured by the clock of the second receiving node, the fourth TOA corresponding to reception of the second calibration signal at the second receiving node; define a third calibration point in a second set of calibration points, representing the first TOD of the first calibration signal and the third TOA at the second receiving node; define a fourth calibration point in the second set of calibration points, representing the second TOD of the second calibration signal and the fourth TOA at the second receiving node; calculate a second regression on the second set of calibration points; and calculate a second frequency offset between the clock of the transmitting node and the clock of the second receiving node based on the second regression. However, the system can simultaneously execute multiple iterations of the second method S200 with any number of receiving nodes configured to receive the set of calibration signals from the transmitting node during one or more calibration slots.

2.5 Calibration Period

For each iteration of the second method S200, the transmitting node can transmit a set of calibration signals within a calibration period—defined as the maximum time between calibration signals for use in a single frequency offset characterization. More specifically, when executing the second method S200, the transmitting node can: transmit a last calibration signal at a TOD measured by the clock of the transmitting node, the TOD succeeding the first TOD by a calibration period. Upon receiving the last calibration signal at the receiving node, at a last TOA measured by the clock of the receiving node, the system can: define a final calibration point of the set of calibration points, the final calibration point of the set of calibration points comprising the last TOD at the transmitting node of the last calibration signal and the last TOA at the receiving node of the last calibration signal.

The duration of this calibration period governs the precision with which the system can characterize the frequency offset between nodes. This effect is due to the fact that the receiving node has a limited timestamping accuracy (e.g., due to timestamping noise) and therefore detects accumulated time domain drift (due to a frequency offset between nodes) upon the time domain drift becoming measurable over timestamping noise. Therefore, given a longer calibration period, the system can detect smaller frequency offsets between nodes as the time domain drift between the nodes has had longer to accumulate. The timestamping noise for a receiving node can include effects of quantization noise at the ADC of the receiving node and accumulated jitter from either the clock of the transmitting node or the clock of the receiving node. Despite improvements in the precision of the frequency offset characterization resulting from the use of longer calibration periods, the system can also improve its resiliency to second-order effects (time domain change in the frequency offset between nodes) and the latency introduced by the second method S200 by utilizing a shorter calibration period.

Therefore, the system can calculate a calibration period that can satisfy the desired precision of the frequency offset characterization, while reducing latency introduced by the second method S200. Assuming a timestamping noise distribution $\Delta$ the system can define a maximum timestamping noise, $\Delta_{max}$, based on a threshold interval in $\Delta$ and excluding outliers in $\Delta$. The system can calculate $\Delta_{max}$ based on previous iterations of the second method S200 executed by nodes including similar hardware components to those nodes currently executing Blocks of the method S200 or the system can utilize a theoretical estimation of $\Delta_{max}$ input by an administrator of the system. The system can then define a desired precision, $\delta$ (expressed as a proportion: e.g., 0.000001 for a precision of one PPM), based on an input by an administrator of the system. Additionally, the system can define a $\delta$ based on an expected frequency offset between the transmitting node and the receiving node. In one implementation, the system can calculate a calibration period based on a $\delta$ equal to ten percent of the expected frequency offset.

However, the system can define $\delta$ as any function of the expected frequency offset. Therefore, the system can (indirectly) calculate the calibration period based on the expected frequency offset between the transmitting node and the receiving node.

Given $\Delta_{max}$ and $\delta$ the system can: calculate the calibration period, $m_{max}-m_{min}$ by solving for $m_{max}-M_{min}$ in the inequality:

$$m_{max}-m_{min} > \Delta_{max}/\delta.$$

In one example, given a $\Delta_{max}$ equal to 100 nanoseconds and a $\delta$ equal to 10 PPB, the system calculates a calibration period of at least 10 seconds.

2.5.1 Calibration Period Refinement

Figure 9:
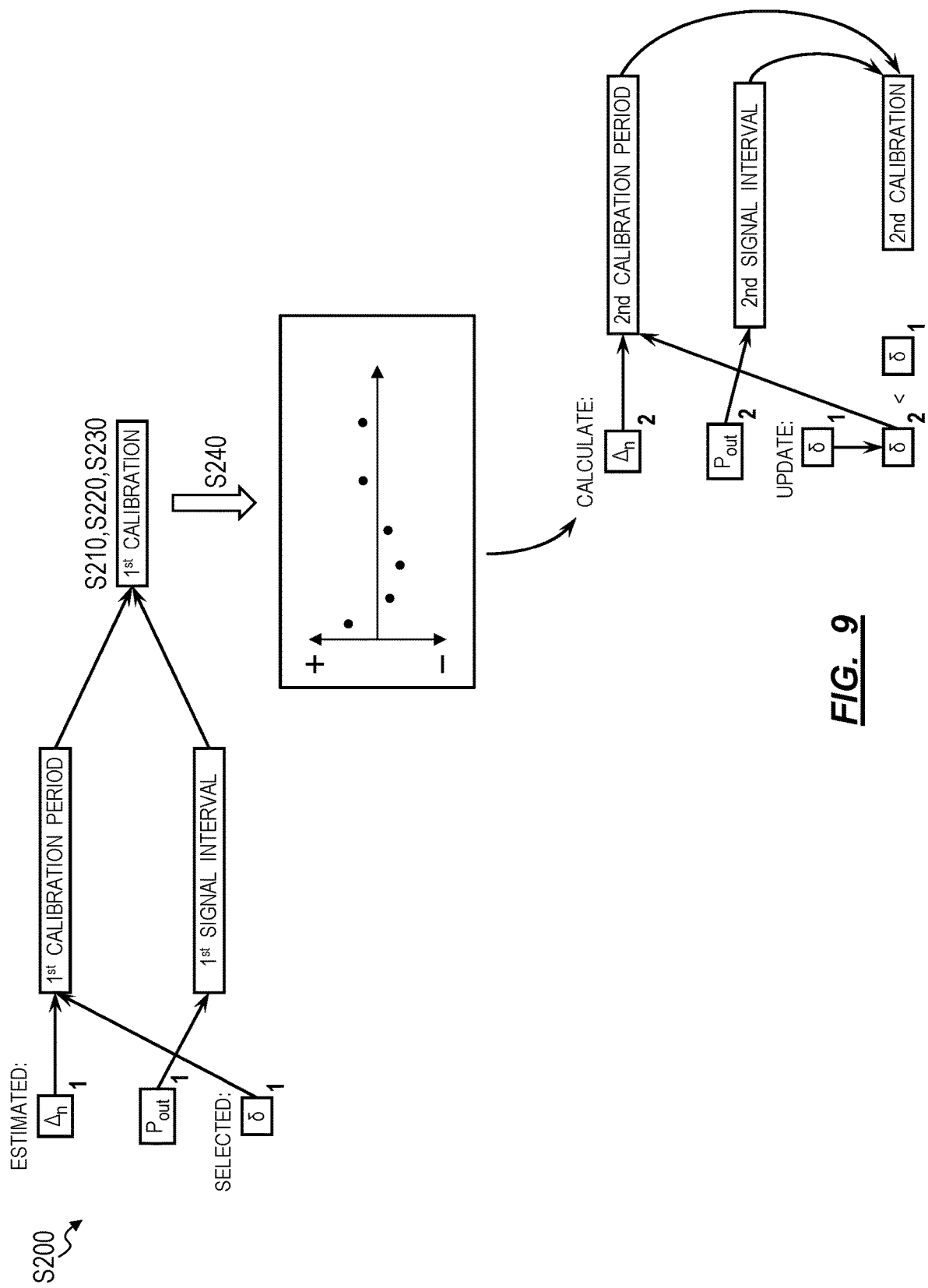
FIG. 9 is a flowchart representation of the second method.

As shown in FIG. 9, in one implementation, the system can refine the calibration period over successive iterations of the second method S200 to further improve the characterization of the frequency offset between two nodes after an initial characterization of the frequency offset. More specifically, the system can: calculate a timestamping noise of the clock of the receiving node relative to the clock of the transmitting node based on a residual of a first regression; and calculate an adjusted calibration period based on a desired precision and the timestamping noise. The system can then perform a second iteration of the second method S200 to further prove the precision of the frequency offset characterization of the clocks of the two nodes. Therefore, subsequent to calculating an adjusted calibration period, the transmitting node can: transmit a fourth calibration signal at a fourth TOD measured by the clock of the transmitting node; transmit a fifth calibration signal at a fifth TOD measured by the clock of the transmitting node and succeeding the fourth TOD by a signal interval; and transmit a sixth calibration signal at a sixth TOD measured by the clock of the transmitting node and succeeding the fourth TOD by the adjusted calibration period. The receiving node can then: receive the fourth calibration signal at a fourth TOA measured by the clock of the receiving node adjusted by the first frequency offset; receive the fifth calibration signal at a fifth TOA measured by the clock of the receiving node adjusted by the first frequency offset; and receiving the sixth calibration signal at a sixth TOA measured by the clock of the receiving node adjusted by the first frequency offset. The system can then: define a fourth calibration point in a second set of calibration points, the fourth calibration point including the fourth TOD and the fourth TOA; defining a fifth calibration point in the second set of calibration points, the fifth calibration point including the fifth TOD and the fifth TOA; define a final calibration point of the second set of calibration points, the final calibration point of the second set of calibration points comprising the sixth TOD and the sixth TOA; calculate a second regression on the second set of calibration points; and calculate a second frequency offset between the first clock and the second clock compensated by the first frequency offset.

Thus, after the system executes an iteration of the second method S200 with lower latency—and therefore lower precision—and obtains an initial frequency offset between the transmitting node and the receiving node, the system can calculate an actual timestamping noise (as opposed to an a priori estimate of the timestamping noise) in order to subsequently calculate an adjusted calibration period. Additionally or alternatively, the system can decrease $\delta$, and thereby increase the precision of the second frequency offset characterization. The system can continue to execute additional iterations of the second method S200 to further increase the precision of the frequency offset characterization. Meanwhile, each of the nodes executing the additional iterations of the second method S200 can transmit and/or receive according to other functions of the node during intervening time synchronization slots, data transfer slots, and/or any other type of TDMA slot.

2.6 Signal Intervals

Generally, in Block S210, and as shown in FIG. 7, the transmitting node executing Blocks of the second method S200 transmits calibration signals according to the aforementioned calibration transmission patterns. However, the transmitting node can transmit calibration signals separated by various signal intervals depending on the implementation. More specifically, the transmitting node: transmits a first calibration signal at a first TOD measured by a clock of the transmitting node; and transmits a second calibration signal at a second TOD measured by the clock of the first node and succeeding the first time-of-departure by an initial signal interval. By decreasing the signal interval for a given calibration period, the system can increase the number of calibration points generated for a given frequency offset characterization thereby improving the accuracy of frequency offset characterization in the face of timestamping noise.

The system can calculate an initial signal interval for the second method S200 based on the timestamping noise distribution $\Delta$, which can result from the noise floor of the receiver chain of the receiving node and transmitter chain of the transmitting node, interference in the frequency band of operation, jitter in the crystal oscillators of the transmitting node and the receiving node, and/or operating conditions of the transmitting node and the receiving node (e.g., ambient temperature and pressure). Therefore, in one implementation, the system can estimate $\Delta$ based on characteristics of the clocks of the transmitting node and the receiving node. More specifically, the system can: access clock characteristics of the clock of the transmitting node; access clock characteristics of the clock of the receiving node; and calculate an initial signal interval based on clock characteristics of the clock of the transmitting node and clock characteristics of the clock of the receiving node.

Generally, given a wider estimated $\Delta$, the system can transmit calibration signals with a shorter signal interval in order to increase the accuracy of the frequency offset characterization. Likewise, given a narrower estimated $\Delta$, the system can transmit calibration signals with a longer signal interval to free up the transmitting and/or receiving node to perform other functions.

$\Delta$ can be modeled as the sum of gaussian noise term $\Delta_N = N(0, \sigma^2)$ and non-gaussian noise term $\Delta_{out}$, where $\Delta_{out} \gg \Delta_N$ with probability $P_{out}$ and $\Delta_{out} \approx 0$ otherwise. Given this model, the system can calculate the signal interval based on an outlier probability, $P_{out}$, which is defined as the probability in $\Delta$ that a given timestamping measurement has a variation from the accurate timestamp greater than the outlier threshold, $\Delta_{max}$. An administrator of the system may define $\Delta_{max}$ as a certain number of standard deviations of the gaussian component of $\Delta$. For example, an administrator of the system may define $\Delta_{max} = 4\sigma$. Therefore, the system can calculate a number of calibration signals, n, based on $P_{out}$. For example, the system can calculate n by evaluating the inequality:

$$P_{out}^n < P_T, n \in \mathbb{N}.$$

Where $P_T$ is the probability threshold that all timestamps (i.e., calculations of TOA) are outliers. For example, if $P_T = 0.001$ and $P_{out} = 0.20$, then the system calculates n greater than 5. Thus, the system can: calculate an outlier probability based on the timestamping noise; calculate a number of calibration signals in a calibration period based on the desired accuracy and the outlier probability; and divide the calibration period by the number of calibration signals to calculate the adjusted signal interval.

In an alternative implementation, the system can calculate n based on a desired statistical confidence interval for a slope of a best-fit line in a linear regression, which dictates the frequency offset as further described below. Thus, the system can calculate n given a desired width of a confidence interval and the distribution $\Delta$. Assuming $\Delta$ is entirely gaussian, the system can evaluate a least squared error expression to calculate n.

In one implementation, given a value of n, the system can divide the calibration period, $m_{max} - m_{min}$, by n to calculate the signal interval. Alternatively, for calibration transmission patterns wherein the system varies the signal interval between calibration signals within a single calibration slot or across multiple calibration slots, the system can distribute and/or cluster n calibration signals according to the specified calibration transmission pattern.

However, the nodes and or remote server implementing the second method S200 can adaptively vary the signal interval in any other way.

2.6.1 Signal Interval Refinement

As shown in FIG. 9, the system can adjust the signal interval between iterations of the second method S200. More specifically, the system can: calculate a timestamping noise of the clock of the receiving node relative to the clock of the transmitting node based on a residual of the first regression; and calculate an adjusted signal interval based on the timestamping noise. The system can then execute a second iteration of the second method S200 utilizing the adjusted signal interval instead of the initial signal interval. Additionally, the system can calculate the adjusted signal interval based on a desired accuracy, a timestamping noise, and a frequency offset calculated during the first iteration of the second method S200.

In one implementation, the system can calculate an observed $\Delta$ based on a residual of the regression on the first set of calibration points generated in a first iteration of the second method S200. For example, the system can calculate an observed gaussian term, $\Delta_N$, based on the standard deviation (excluding outliers) of the residuals of the first regression and a new $P_{out}$ based on the observed proportion of outliers in the residuals of the first regression. The system can then utilize the newly calculated $\Delta_N$ and $P_{out}$ to calculate a new n as described above and derive an adjusted signal interval based on the calibration period and n. After the system performs successive calculations of the frequency offset between the transmitting node and the receiving node, the system can continue to characterize $\Delta_N$ and $P_{out}$ in order to more effectively select a signal interval that will result in more accurate calculation of the frequency offset between the transmitting node and the receiving node.

Additionally or alternatively, the system can adjust the signal interval within the same iteration of the second method S200 to enable the system to respond to detected differences between expected timestamping noise and expected frequency offsets between nodes as soon as possible. For example, if a transmitting node transmits two calibration signals with an initial signal interval and the system detects that the received signal interval (the signal interval as measured by the clock of the receiving node) does not differ (within the timestamping precision of the receiving node) from the nominal initial signal interval, the system can lengthen the subsequent signal interval in order to better detect the relative frequency based drift between the clocks of the transmitting node and the receiving node. More specifically, the system can: calculate a received signal interval as a difference between the first TOA and the second TOA as measured by the clock of the receiving node; in response to the received signal interval equaling an initial signal interval within a measurement variation, schedule transmission, from the transmitting node, of a third calibration signal at a third TOD measured by the clock of the transmitting node and succeeding the second TOD by a second signal interval greater than the first interval; receive, from the receiving node, a third TOA measured by the clock of the receiving node, the third TOA corresponding to reception of the first calibration signal at the receiving node; and define a third calibration point in the set of calibration points, representing the third TOD and the third TOA.

Frequency Offset Calculation

Once a transmitting node has transmitted calibration signals according to the calibration transmission patter (parameterized by a calibration period and a signal interval) in Blocks S210 and S220, the system can define a set of calibration points representing the TOD and TOA of each calibration signal in order to characterize the relative time domain drift, caused by a frequency offset, between the clock of the transmitting node and the clock of the receiving node. More specifically, in Block S230 the system can: define a first calibration point in a first set of calibration points, the first calibration point including the first TOD and the first TOA of the first calibration signal; and define a second calibration point in the first set of calibration points, representing the second TOD and the second TOA in Block S230. Additionally, the system can execute Block S230 to define additional calibration points for each of the n calibration signals transmitted by the transmitting node. The system can define each calibration point as a two-dimensional vector that includes parameters m and p, where m is a timing index for the TOD of a calibration signal and p is a timing index for the TOA of the same calibration signal.

In order to ensure that the TOD at the transmitting node is matched correctly to the TOA at the receiving node for each calibration signal in the set of calibration signals, the system can match the TODs to the TOAs sequentially (e.g., by matching the first TOD transmitted by the transmitting node to the first TOA received by the receiving node). Alternatively, the transmitting node can transmit calibration signals that include an identifier that the receiving node can read in order to accurately identify the calibration signal that corresponds with a particular TOA. The receiving node can then transmit this identifying information to a remote server or master node coordinating the second method S200.

Upon defining a set of calibration points representing each of the transmitted calibration signals, the system can calculate a regression on the set of calibration points in Block S240. The system, via linear regression, calculates a best fit linear function describing the relationship between m and p. The theoretical relationship between a given value of m and p is given by the following equation:

$$p_i = \frac{1}{T}(\tau + b_1 - b_2) + \frac{c_1}{c_2}m_i + \Delta_i,$$

Wherein T is the nominal clock period of the clock of the transmitting node and the clock of the receiving node, $\tau$ is the propagation time between the two nodes, $b_1 - b_2$ is the time bias between the clock of the transmitting node and the clock of the receiving node, $c_1$ is the frequency offset of the transmitting node from the nominal clock frequency, $c_2$ is the frequency offset of the receiving node from the nominal clock frequency, and $\Delta_i$ is a sample from the timestamping noise distribution for the ith calibration signal. Assuming constant $\tau$ and $b_1 - b_2$ across the calibration period, the system can, upon calculating a regression for the set of calibration points ($m_i$, $p_i$, therefore obtain the ratio $$\frac{c_1}{c_2}.$$

This ratio does not define the magnitude of the frequency offset between the transmitting node and the receiving node $c_1 - c_2$. However, via a first order Taylor expansion of $$\frac{c_1}{c_2}:$$

$$\frac{c_1}{c_2} \approx 1 + c_1 - c_2, \text{ for small values of } c_1 \text{ and } c_2.$$

Given that most crystal oscillators only deviate from their nominal frequency on the order of PPM, the above equality holds sufficiently to extract the frequency offset $c_1 - c_2$ based on the slope of the best fit line of the regression. Thus:

$$p_i = \frac{1}{T}(\tau + b_1 - b_2) + (1 + c_1 - c_2)m_i + \Delta_i.$$

Therefore, the system can calculate a frequency offset between two nodes by calculating a slope of best-fit line of the first set of calibration points and solving for $c_1 - c_2$ in: $\beta = 1 + c_1 - c_2$, wherein $\beta$ represents a slope of the linear regression on the calibration points.

In one implementation, the system identifies and excludes outliers from the regression in order to calculate a more accurate calculation of the frequency offset. Additionally or alternatively, the system can perform any other statistical technique to improve the estimate of the frequency offset in the presence of unknown $\Delta_i$.

Figure 8:
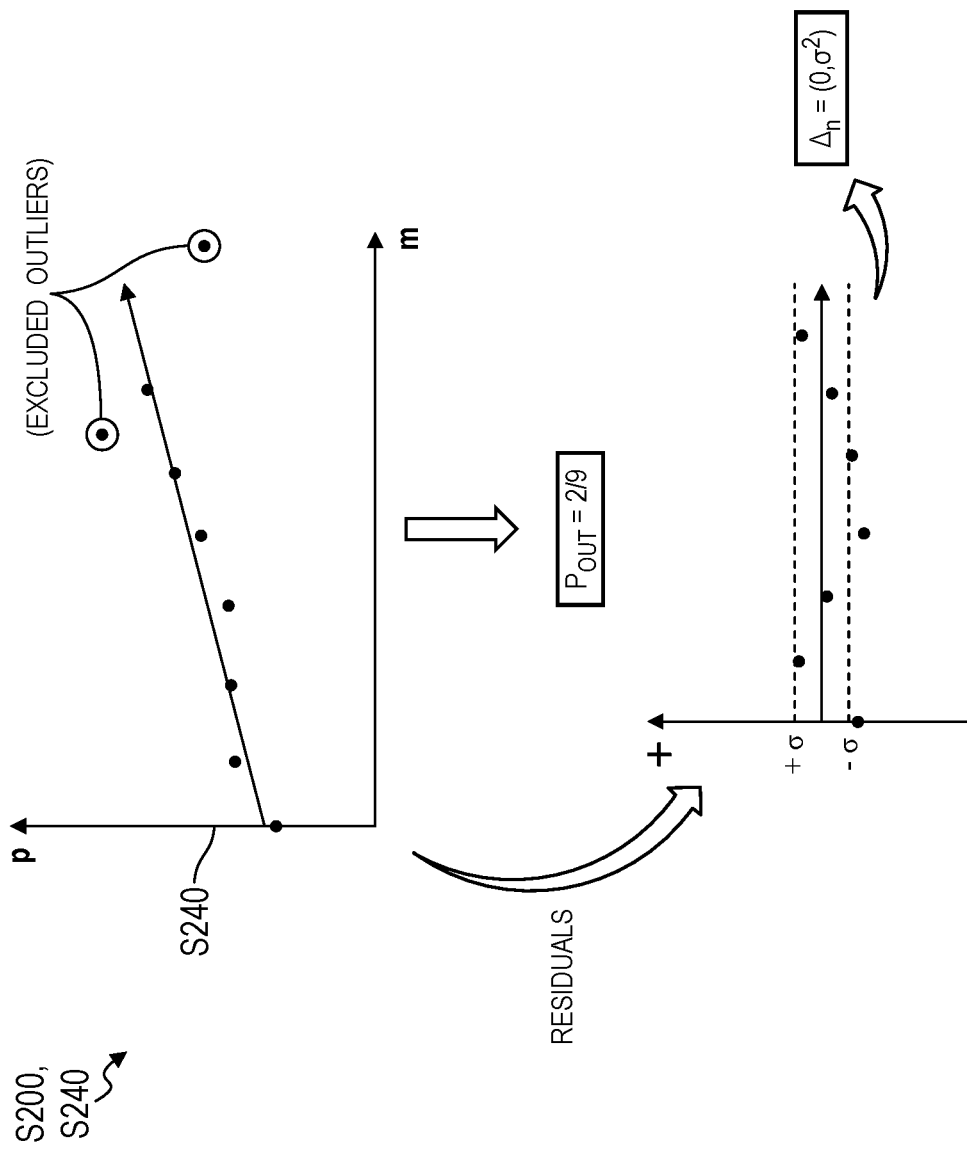
FIG. 8 is a flowchart representation of the second method.

In addition to calculating the frequency offset between the transmitting node and the receiving node, the system can extract improved estimations of $\Delta_N$ and $P_{out}$ based on residuals of the regression, as shown in FIG. 8. In one implementation, the system can calculate an updated $P_{out}$ by identifying outliers in the residuals of the regression and calculating the frequency of those outliers. The system can then calculate a standard deviation of the non-outlier residuals in order to improve the estimate of $\Delta_N$. In either case, the system can integrate residuals calculated in multiple iterations of the method S200 to calculate the updated values of $\Delta_N$ and $P_{out}$. For example, the system can calculate $P_{out}$ as the outlier proportion across all iterations of the second method S200 executed by a particular pair of nodes in the mesh network.

2.7.1 Signal Interval Deviation

In an alternative implementation, the receiving node receives the set of calibration signals transmitted by the transmitting node and calculates TOAs for the set of calibration signals. The system can calculate a frequency offset based on the set of TOAs for the received calibration signals. More specifically, each TOA is subtracted from the subsequent TOA to determine the received signal interval between each of the received signals. The set of received signal intervals are then subtracted from a corresponding set of transmitted signal intervals, as measured according to the clock of the transmitting node, to calculate a deviation for each received signal interval as compared to the transmitted signal interval. The set of deviations are then summed and divided by the cumulative duration of the transmitted signal intervals to determine an average error ratio. The receiving node or the remote server executing the second method S200 then multiplies the average error ratio by the sampling frequency to obtain the frequency offset between the transmitting node and the receiving node. Thus, the process for calculating the frequency offset between a transmitting node and a receiving node is expressed as follows:

$$f_r - f_t \approx f_t \sum_{i=1}^{n} \frac{s_{r,i} - s_{t,i}}{s_{t,i}},$$

wherein $f_r$ is the clock frequency of the receiving node, $f_t$ is the clock frequency of the transmitting node, n is the number of calibration signals received, $s_{r,i}$ is the signal interval in samples-per-second according to the clock of the receiving node, and $s_{t,i}$ is the signal interval in samples-per-second according to the clock of the transmitting node.

In one implementation, statistical techniques are applied to the set of deviations $s_{r,i}-s_{t,i}$ to remove outliers and/or detect frequency drift during the calibration period. For example, the second method S200 can include plotting residuals of the average deviation against time to determine if there are any trends in the set of deviations over the sampling period.

2.8 Frequency Compensation

Upon calculating, the frequency offset between the transmitting node and the receiving node, the system can compensate for the frequency offset in order to improve the ability of the nodes to calculate the time bias, $b_1-b_2$, by executing the first method S100. In one implementation, either the transmitting node or the receiving node can compensate for the measured frequency offset. Either the transmitting node or the receiving node can correct the timestamp for one of the clocks periodically to cancel out the frequency offset induced drift. Alternatively, the system does not compensate for the frequency offset at either of the nodes and instead accounts for the time domain drift when scheduling slots in the TDMA frame and when performing TOA calculations for synchronization signals while executing the first method S100.

2.9 Frequency Recalibration

One variation of the second method S200 includes recalibrating frequency offset between nodes in the network in response to environmental factors. Generally, if a significant change in environmental conditions such as temperature, humidity, pressure, etc. is detected at either the transmitting node or receiving node, the system can reinitiate the frequency calibration process. In one implementation, the second method S200 includes reinitiating the frequency calibration process in response to a change in temperature greater than a threshold temperature, a change in humidity greater than a threshold humidity, and/or a change in pressure greater than a threshold pressure. Alternatively or additionally, the second method S200 includes reinitiating the frequency calibration process in response to detecting acceleration greater than a threshold acceleration at one of the nodes.

In one implementation, the transmitting node, transmitting a set of calibration signals during a synchronization slot in the first method S100. In this implementation, the frequency offset can be recalculated while still determining a time bias between nodes in the network according to the method S100. For example, whenever the transmitting node transmits a synchronization signal, an additional signal can be sent after a signal interval. The signal interval between these two signals can then be measured at the receiving device according to the second method S200. Alternatively, the second method S200 includes modifying the TDMA frame to include a calibration slot during which the frequency calibration process is executed.

2.10 Node Characterization

In one implementation, upon updating estimates of $\Delta_N$ and $P_{out}$ for a particular pair of nodes, the system can apply these estimates to subsequent calibration processes executed between different pairs of nodes with similar hardware. For example, if a first node and a second node execute the second method S200 and, therefore, the system obtains updated estimates of $\Delta_N$ and $P_{out}$, the system can use the updated estimates for $\Delta_N$ and $P_{out}$ for the first node and the second node to calculate an initial calibration period and an initial signal interval for the second method S200 executed between the first node and a third node (assuming the third node includes similar hardware to the second node). More specifically, the system can: calculate a timestamping noise of the clock of the receiving node relative to the clock of the transmitting node based on a residual of a first regression; calculate an adjusted signal interval based on the timestamping noise; schedule transmission, from the transmitting node, of a third calibration signal at a third TOD measured by the clock of the transmitting node; schedule transmission, from the node transmitting node, of a fourth calibration signal at a fourth TOD measured by the clock of the transmitting node and succeeding the third TOD by the adjusted signal interval; receive, from a second receiving node, a third TOA measured by a clock of the second receiving node, the third TOA corresponding to reception of the third calibration signal at the node second receiving node; receive, from the second receiving node, a fourth TOA measured by the clock of the second receiving node, the fourth TOA corresponding to reception of the fourth calibration signal at the second receiving node; define a third calibration point in a second set of calibration points, representing the third TOD and the third TOA; define a fourth calibration point in the second set of calibration points, representing the fourth TOD and the fourth TOA; calculate a second regression on the second set of calibration points; and calculate a second frequency offset between the first clock and the third clock based on the second regression.

Figure 10:
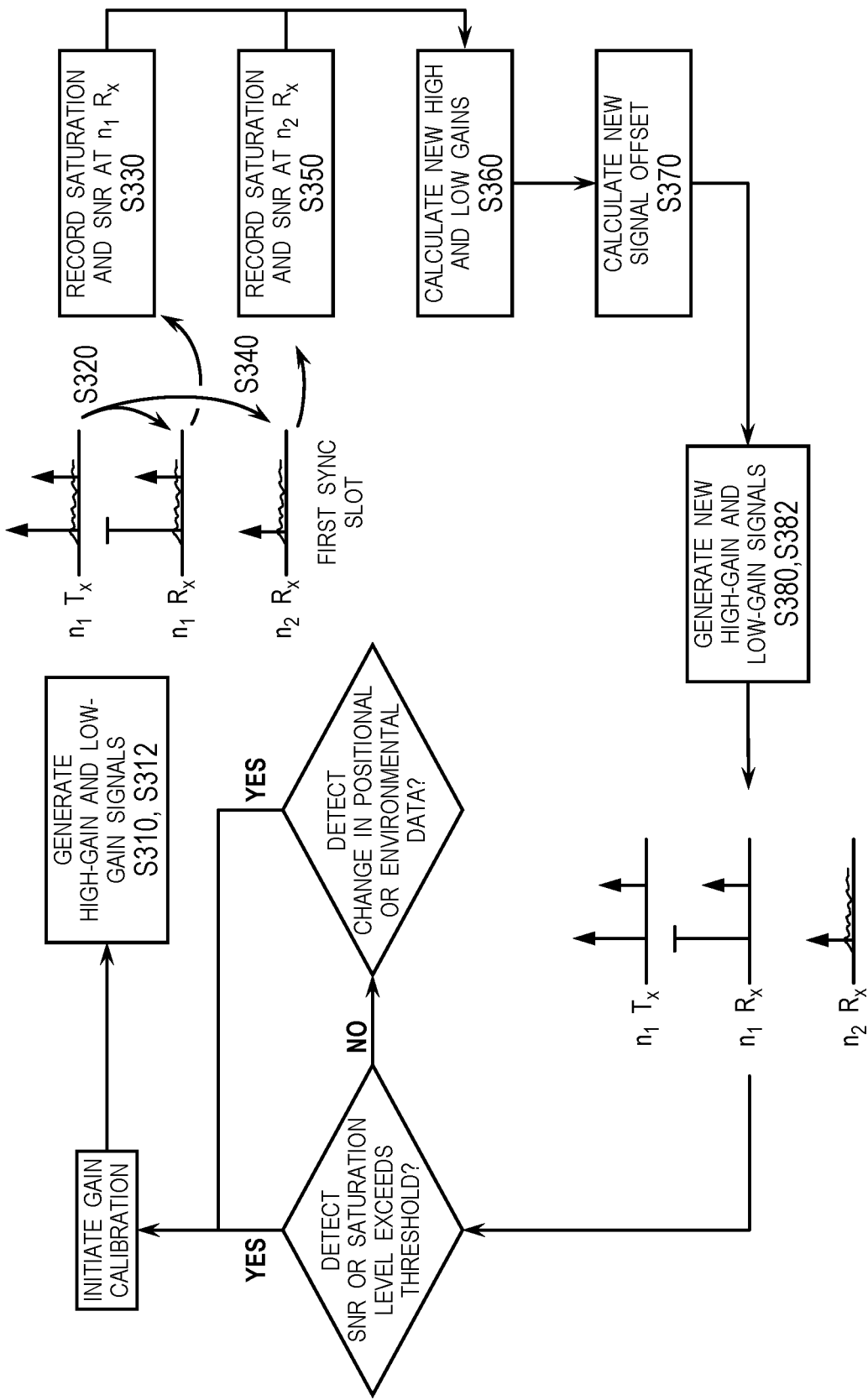
FIG. 10 is a flowchart representation of a third method.

Thus, the system can update initial estimates for the initial frequency offset, the timestamping noise, and/or the outlier probability based on pervious iterations of the method S200 executed between nodes of similar hardware 3. Third Method As shown in FIG. 10, a method S300 for selecting gain levels for synchronization signals includes, at a first node including a self-receive signal generator: at a first time, generating a first high-gain synchronization signal at a first high-gain level in Block S310; at a second time offset from the first time by a first signal offset, generating a first low-gain synchronization signal at a first low-gain level in Block S312; generating a first low-gain self-receive signal responsive to generating the first low-gain synchronization signal in Block S320; and recording at a receiver of the first node a saturation level of the first low-gain self-receive signal and a signal-to-noise ratio (hereinafter "SNR") of the first low-gain self-receive signal in Block S330. The third method S300 also includes, at a second node: receiving at a receiver of the second node the first high-gain synchronization signal in Block S340; and recording at the receiver of the second node a saturation level of the first high-gain synchronization signal and an SNR of the first high-gain synchronization signal in Block S350. The third method S300 further includes: calculating a second high-gain level for a second high-gain synchronization signal based on the saturation level of the first synchronization signal, the SNR of the first synchronization signal, and the first high-gain level in Block S360; calculating a second low-gain level for a second low-gain synchronization signal based on the saturation level of the first low-gain self-receive signal, the SNR of the first low-gain self-receive signal, and the first low-gain level in Block S362; and calculating a second signal offset based on a ratio of the second low-gain level and the second low-gain level in Block S370. The third method S300 also includes, at a first node: at a third time, generating the second high-gain synchronization signal at the second high-gain level in Block S380; and at a fourth time offset from the third time by a second signal offset, generating a second low-gain synchronization signal at a second low-gain level in Block S382.

3.1 Applications

Generally, the third method S300 defines a gain calibration process between a pair of nodes in a network and, like the methods S100 and S200, is executed by a pair of nodes in a network and/or a remote server (hereinafter "the system" as shown in FIG. 11). The third method S300 calibrates the amplifier gain of a wireless node that includes a self-receive generator. Because each signal transmitted by a transmitting node including a self-receive generator is propagated to the receive port of the transmitting node, a gain level high enough to transmit a signal to another node may cause saturation at the receive port of the transmitting node. Thus, the third method S300 includes transmitting two synchronization signals separated by a specific signal offset within a synchronization slot. One of the two synchronization signals is a high-gain synchronization signal that is transmitted at a high-gain such that the high-gain synchronization signal is well received at a receiving node. The other synchronization signal is a low-gain synchronization signal that is transmitted at a low-gain level such that the resulting low-gain self-receive signal does not saturate the receive port of the transmitting node. Thus, if only one synchronization signal is well-received by a receiving node (or by the receiver of the transmitting node), the TOA of the self-receive signal can still be compared to the TOA of the receive signal at the receiving node by considering the known signal offset. For example, if a receiving node receives the high-gain synchronization signal and the transmitting node receives the self-receive signal corresponding to the low-gain synchronization signal, the time that the high-gain synchronization signal was transmitted is calculated based on the TOA of the self-receive signal corresponding to the low-gain signal and the known signal offset.

In the set of two synchronization signals, a first synchronization signal is transmitted at a higher gain such that the first synchronization signal is detectable at the receiver of a receiving node (e.g. above the noise floor and below saturation levels) and a second synchronization signal is transmitted at a lower gain such that the self-receive signal based on the second synchronization signal is detectable at the receiver of the transmitting node (e.g. above the noise floor and below saturation levels). The order of the set of two differential gain synchronization signals is interchangeable (e.g. the higher gain signal can be transmitted after the lower gain signal or vice versa).

The nodes and/or remote server executing the third method S300 can adjust the signal offset between the high-gain signal and the low-gain signal. Generally, the third method S300 includes a signal offset that is as short as possible to minimize clock drift that may occur between the high-gain signal and the low-gain signal. However, this signal offset is limited by hardware and software constraints including the dynamic range and the slew rate of the ADC and DAC in the transmitting node and the ADC of the receiving node in addition to the gain bandwidth product (hereinafter "GBWP") and slew rate of the amplifier in the transmitting nodes.

Thus, the third method S300 includes an iterative process for selecting the gain of the high-gain and low-gain synchronization signals as well as the signal offset. First, based on known or estimated initial conditions such as the proximity between the two communicating nodes, a high-gain level and a low-gain level are selected. Based on the high-gain level and the low-gain level, the slew rate and the dynamic range of the ADCs and DACs of the nodes, the transmitting node and/or the remote server calculates a minimal measurement acquisition interval, that limits drift between the clocks during the signal offset and enables the frequency offset and time offset to be measured accurately at the intended high-gain level and low-gain level.

The transmitting node and the receiving node record the SNR and the saturation level for each signal resulting in four values for each pulse (SNR at transmitting node, saturation level at transmitting node, SNR at receiving node, and saturation level at receiving node). The third method S300 can include transmitting these values via a wireless network to a remote server or to one of the nodes for further processing. If the high-gain signal results in an excessive saturation level at the receiver of the receiving node, the gain of the high-gain signal is reduced in the subsequent pulse. Alternatively, if the high-gain signal is received with low SNR or not received at all at the receiving node then the gain of the high-gain signal is increased in the subsequent pulse. Likewise, if the self-received signal based on the low-gain signal has an excessive saturation level at the receiver of the transmitting node, then the gain of the low-gain signal is reduced in the subsequent pulse. Alternatively, if the low-gain signal is not detected or has an excessively low SNR at the transmitting node, then the gain of the low gain signal is increased in the subsequent pulse. The third method S300 can include calculating the high and low gains based on a propagation model and any known parameters about the propagation environment (i.e., the receiver circuit for the self-receive signal gain) such as the distance between the nodes or the gain of the self-receive signal generator. Additionally or alternatively, the third method S300 can include varying the gain of either the high or low gain by incrementing by a predetermined amount based on the received saturation and SNR values. Therefore, the third method S300 can include utilizing a function that takes in the saturation level and SNR value to determine an increment for the subsequent pulse for either the high-gain signal or the low-gain signal.

Thus, based on the above logic, the nodes and/or remote server execute the third method S300 to determine a high-gain level and a low-gain level for the subsequent pulse including a second high-gain synchronization signal and a low-gain synchronization signal. The third method S300 includes adjusting the signal offset based on the gain values for the subsequent pulse. For example, if the ratio of the high gain value and the low gain value is within the dynamic range of the ADC of the receiving node, the signal offset is shortened, alternatively, if the ratio between the high gain value and the low gain value is greater than the dynamic range of the ADC of the receiving node, then a longer signal offset is used that accounts for the slew rate of the amplifier. Furthermore, the third method S300 can include adjusting the signal offset based on the settling time of the ADC of the receiving node and/or the accumulated clock error between the transmitting and receiving nodes.

Additionally, the nodes and/or remote server execute the third method S300 between each synchronization slot for a pair of nodes in a wireless network. Alternatively, the nodes and/or remote server execute the third method S300 selectively according to a set of criteria (e.g. a change in the saturation level or SNR of the high-gain synchronization signal and/or the low-gain synchronization signal).

3.2 Gain Calibration

As shown in FIG. 10, the third method S300 includes calibrating the gain levels of a high-gain synchronization signal and a low-gain synchronization signal, as well as a signal offset between the two signals such that at least one of the signals is received at both the receiving node (e.g. a synchronization signal) and the transmitting node (e.g. a self-receive signal). More specifically, the third method S300 is an iterative process that can successively adjust the gain levels of the high-gain synchronization signal and the low-gain synchronization signal according to target saturation levels and SNR values at the receiver of each node. Gain levels are adjusted according to the logical flow shown in FIG. 10.

After the nodes and/or remote server calculate gain levels for a subsequent synchronization slot, the nodes and/or remote server calculate a signal offset between the subsequent high-gain synchronization signal and low-gain synchronization signal.

Finally, the third method S300 can include reinitiating the gain calibration process in response to various recalibration criteria. For example, the third method S300 can include detecting a change in the saturation level of a received synchronization signal greater than a threshold saturation level when compared to a previous synchronization signal. Alternatively, the third method S300 can include reinitiating the gain calibration process in response to detected movement, temperature change, or other environmental factors at either node.

3.3 Gain Adjustment

As shown in FIG. 10, the third method S300 includes adjusting the high-gain level and low-gain levels of the synchronization signals transmitted during a synchronization slot. Generally, the third method S300 includes calculating subsequent high-gain levels and low-gain levels based on previous levels of saturation and SNR recorded at either node. The third method S300 includes calculating high-gain levels such that a high-gain synchronization signal received at the receiving node is recorded with an SNR greater than a threshold SNR and a saturation level lower than a threshold saturation level. The third method S300 calculates low-gain levels such that a low-gain self-receive signal generated from the low-gain synchronization signal received at the transmitting node is recorded with an SNR greater than the threshold SNR and a saturation level lower than the threshold saturation level.

Additionally, the third method S300 can also include integrating additional data in the calculation of the high-gain and low-gain levels, such as positional data from an IMU (e.g. relative position, velocity, acceleration, orientation, angular velocity, and/or angular acceleration) to preemptively adjust gain levels in response to movement of either of the nodes. Additionally, the third method S300 can include measuring the velocity of the nodes relative to each other by measuring a Doppler shift in an incoming signal.

When initiating the gain calibration process for the first time, the third method S300 includes selecting a gain value based on any information regarding the propagation environment between the two nodes (for the high-gain signal) and the gain of the self-receive signal generator. In one example, if the distance between the two nodes and/or the orientation of the antennas of the two nodes have been recorded, then the nodes and/or remote server executing the third method S300 can calculate an initial high-gain level based on a physical model for radiated signal strength. In another example, if the gain of the generated self-receive signal is recorded then the nodes and/or remote server executing the third method S300 can calculate an initial low-gain level by choosing a gain that theoretically satisfies the saturation level threshold and the SNR threshold given the recorded gain of the self-receive signal generator.

After the initial gain levels are calculated and the transmitting node transmits the high-gain synchronization signal and the low-gain synchronization signal at the calculated levels, the high-gain level and the low-gain level are calculated according to FIG. 10. FIG. 10 is a flow diagram illustrating a series of steps for calculating a high-gain level and a low-gain level for a subsequent high-gain synchronization signal and a subsequent low-gain synchronization signal. The third method S300 includes executing this process iteratively until the saturation threshold and SNR threshold are satisfied at both nodes.

In one implementation, the nodes and/or remote server executing the third method S300 adjust the high-gain level by evaluating a physical model of the propagation environment. Alternatively, the third method S300 can include adjusting the high-gain level by a predefined adjustment amount in a direction necessary to satisfy either the saturation level threshold or the SNR threshold. Likewise, in one implementation, the nodes/and or remote server can adjust the low-gain level by evaluating a model of the DAC, self-receive signal generator, and ADC. Alternatively, the third method S300 an include adjusting the low-gain level by a predefined adjustment amount in the direction necessary to satisfy either the saturation level threshold or the SNR threshold.

However, the adjustments made to the high-gain level and the low-gain level for subsequent synchronization signals can be calculated using any other process that satisfies the saturation level threshold and the SNR threshold at the transmitting and receiving nodes.

3.4 Signal Offset

After the high-gain level and the low-gain level for the subsequent high-gain synchronization signal and the subsequent low-gain synchronization signal have been calculated, the third method S300 includes calculating a signal offset between the high-gain synchronization signal and the low-gain synchronization signal. Generally, the signal offset is calculated based on factors such as: the high-gain level; the low-gain level; the slew rate of the DAC in both nodes, the slew rate of the ADC in both nodes, and/or the transmitter amplifier; and the dynamic range of the DAC and/or ADC of both nodes.

More specifically, the third method S300 includes determining whether the ratio of the high-gain level and the low-gain level exceeds a threshold ratio. If the ratio exceeds the threshold ratio then the gain is modulated at the variable amplifier. If the ratio does not exceed the threshold ratio then the gain is modulated digitally by the FPGA or DSP. After determining whether the gains of the synchronization signals will be modulated by the amplifier or digitally by the FPGA or DSP, the nodes and/or remote server executing the third method S300 calculate the minimum time required to produce each of the synchronization signals at the required gains.

If the gains are modulated at the amplifier, the third method S300 includes dividing the difference between the high-gain level and the low-gain level by the slew rate of the amplifier to determine a minimum signal offset (a small buffer can be added to ensure that the synchronization signals are generated accurately). If the gains are modulated digitally at the FPGA or DSP, then the third method S300 includes determining a minimum slew rate between the DAC of the transmitting node and the ADC of the receiving node (note the transmitting node and receiving node may be the same node in the case of the low-gain synchronization signal because the low-level synchronization signal is self-received). The minimum slew rate is multiplied by the difference between the high-gain level and the low-gain level to determine a minimum signal offset with an optional addition of a small buffer.

In one implementation, when the slew rates or dynamic ranges of the ADC, DAC, and/or amplifier of the transmitting node and/or receiving node are not available, the third method S300 can include calculating the signal offset based on estimated slew rates and/or dynamic ranges of the ADC and DAC to substitute for the unavailable slew rates and/or dynamic ranges.

3.5 Gain Recalibration

As shown in FIG. 10, the third method S300 includes a process for determining when to recalibrate the gain levels of synchronization signals. Generally, the nodes and/or remote server executing the third method S300 can measure and record changes in environmental conditions or whether the saturation threshold or SNR thresholds have not been satisfied by the previous high-gain synchronization signal or low-gain synchronization signal.

More specifically, the third method S300 includes first recording the saturation level and SNR of the synchronization signals from one or more previous synchronization slots and comparing the recorded saturation levels and SNRs to the saturation level threshold and the SNR threshold. In response to detecting that either threshold has not been satisfied for a predetermined number of synchronization slots, the third method S300 can include reinitiating the gain calibration process.

However, if the both the saturation level threshold and the SNR level threshold are satisfied at both nodes, the method includes evaluating environmental criteria to reinitiate the gain calibration process. In one implementation, if one or both of the nodes records greater than a threshold change in positional data (based on IMU data or a Doppler shift detected in a synchronization signal) then the nodes and/or remote server can reinitiate the gain calibration process. Additionally or alternatively, the third method S300 can include reinitiating the gain calibration process in response to a detected change in temperature, humidity, or pressure.

However, the third method S300 can include reinitiating or continuously executing the gain recalibration process in response to any factors or conditions recorded at the transmitting node, receiving node, and/or the remote server.

The systems and methods described herein can be embodied and/or implemented at least in part as a machine configured to receive a computer-readable medium storing computer-readable instructions. The instructions can be executed by computer-executable components integrated with the application, applet, host, server, network, website, communication service, communication interface, hardware/firmware/software elements of a user computer or mobile device, wristband, smartphone, or any suitable combination thereof. Other systems and methods of the embodiment can be embodied and/or implemented at least in part as a machine configured to receive a computer-readable medium storing computer-readable instructions. The instructions can be executed by computer-executable components integrated by computer-executable components integrated with apparatuses and networks of the type described above. The computer-readable medium can be stored on any suitable computer readable media such as RAMs, ROMs, flash memory, EEPROMs, optical devices (CD or DVD), hard drives, floppy drives, or any suitable device. The computer-executable component can be a processor but any suitable dedicated hardware device can (alternatively or additionally) execute the instructions.

As a person skilled in the art will recognize from the previous detailed description and from the figures and claims, modifications and changes can be made to the embodiments of the invention without departing from the scope of this invention as defined in the following claims.

We claim:

1. A method for calculating a frequency offset between two clocks comprising:
    at a first node:
        transmitting a first calibration signal at a first phase-of-departure measured by a first clock of the first node; and
        transmitting a second calibration signal at a second phase-of-departure measured by the first clock and succeeding transmission of the first calibration signal by an initial signal interval;
    at a second node:
        receiving the first calibration signal at a first phase-of-arrival measured by a second clock of the second node; and
        receiving the second calibration signal at a second phase-of-arrival measured by the second clock;
    defining a first calibration point, in a first set of calibration points, the first calibration point representing the first phase-of-departure and the first phase-of-arrival;
    defining a second calibration point, in the first set of calibration points, the second calibration point representing the second phase-of-departure and the second phase-of-arrival;
    calculating a first regression on the first set of calibration points; and
    calculating a first frequency offset between the first clock and the second clock based on the first regression.

2. The method of claim 1, wherein calculating the first regression on the first set of calibration points comprises calculating a slope of a best-fit line of the first set of calibration points and solving for $c_1-c_2$ in: $\beta=1+c_1-c_2$, wherein $\beta$ represents a slope of the first regression, wherein $c_1$ represents a first frequency offset of the first clock from a nominal frequency, and wherein $c_2$ represents a second frequency offset of the second clock from the nominal frequency.

3. The method of claim 1, further comprising:
calculating a timestamping noise of the second clock relative to the first clock based on a residual of the first regression;
calculating an adjusted signal interval based on the timestamping noise;
at the first node:
transmitting a third calibration signal at a third phase-of-departure measured by the first clock; and
transmitting a fourth calibration signal at a fourth phase-of-departure measured by the first clock and succeeding transmission of the third calibration signal by the adjusted signal interval;
at the second node:
receiving the third calibration signal at a third phase-of-arrival measured by the second clock adjusted by the first frequency offset; and
receiving the fourth calibration signal at a fourth phase-of-arrival measured by the second clock adjusted by the first frequency offset;
defining a third calibration point in a second set of calibration points, the third calibration point representing the third phase-of-departure and the third phase-of-arrival;
defining a fourth calibration point in the second set of calibration points, the fourth calibration point representing the fourth phase-of-departure and the fourth phase-of-arrival;
calculating a second regression on the second set of calibration points; and
calculating a second frequency offset between the first clock and the second clock compensated by the first frequency offset.

4. The method of claim 3, wherein calculating the adjusted signal interval further comprises calculating the adjusted signal interval based on a desired accuracy and the timestamping noise.

5. The method of claim 4, wherein calculating the adjusted signal interval based on a desired accuracy and the timestamping noise further comprises:
calculating an outlier probability based on the timestamping noise;
calculating a number of calibration signals for a calibration period based on the desired accuracy and the outlier probability; and
dividing the calibration period by the number of calibration signals to calculate the adjusted signal interval.

6. The method of claim 1, further comprising:
at the first node, transmitting a third calibration signal at a third phase-of-departure measured by the first clock and succeeding transmission of the second calibration signal by the initial calibration period;
at the second node, receiving the third calibration signal at a third phase-of-arrival measured by the second clock; and
defining a final calibration point of the first set of calibration points, the final calibration point of the first set of calibration points comprising the third phase-of-departure and the third phase-of-arrival.

7. The method of claim 6 further comprising:
calculating a timestamping noise of the second clock relative to the first clock based on a residual of the first regression;

calculating an adjusted calibration period based on a desired precision and a timestamping noise;
at a first node:
transmitting a fourth calibration signal at a fourth phase-of-departure measured by the first clock;
transmitting a fifth calibration signal at a fifth phase-of-departure measured by the first clock and succeeding transmission of the fourth calibration signal by a second signal interval; and
transmitting a sixth calibration signal at a sixth phase-of-departure measured by the first clock and succeeding transmission of the fourth calibration signal by the adjusted calibration period;
at the second node:
receiving the fourth calibration signal at a fourth phase-of-arrival measured by the second clock adjusted by the first frequency offset;
receiving the fifth calibration signal at a fifth phase-of-arrival measured by the second clock adjusted by the first frequency offset; and
receiving the sixth calibration signal at a sixth phase-of-arrival measured by the second clock adjusted by the first frequency offset;
defining a fourth calibration point in a second set of calibration points, the fourth calibration point representing the fourth phase-of-departure and the fourth phase-of-arrival;
defining a fifth calibration point in the second set of calibration points, the fifth calibration point representing the fifth phase-of-departure and the fifth phase-of-arrival;
defining a final calibration point of the second set of calibration points, the final calibration point of the second set of calibration points comprising the sixth phase-of-departure and the sixth phase-of-arrival;
calculating a second regression on the second set of calibration points; and
calculating a second frequency offset between the first clock and the second clock compensated by the first frequency offset.

8. The method of claim 7, wherein calculating the adjusted calibration period further comprises solving for $m_{max}-M_{min}$ in: $m_{max}-m_{min}>\Delta_{max}/\delta$, wherein $\Delta_{max}$ represents the timestamping noise, wherein $\delta$ represents the desired precision, and wherein $m_{max}-m_{min}$ represents the adjusted calibration period.

9. The method of claim 1, further comprising:
accessing clock characteristics of the first clock;
accessing clock characteristics of the second clock;
calculating the initial signal interval based on clock characteristics of the first clock and clock characteristics of the second clock.

10. The method of claim 1, further comprising, in response to detecting a change in temperature at the first node or the second node:
at the first node:
transmitting a third calibration signal at a third phase-of-departure measured by the first clock; and
transmitting a fourth calibration signal at a fourth phase-of-departure measured by the first clock;
at the second node:
receiving the third calibration signal at a third phase-of-arrival measured by the second clock adjusted by the first frequency offset; and
receiving the fourth calibration signal at a fourth phase-of-arrival measured by the second clock adjusted by the first frequency offset;

defining a third calibration point in a second set of calibration points, the third calibration point representing the third phase-of-departure and the third phase-of-arrival;

defining a fourth calibration point in the second set of calibration points, the fourth calibration point representing the fourth phase-of-departure and the fourth phase-of-arrival;

calculating a second regression on the second set of calibration points; and calculating a second frequency offset between the first clock and the second clock compensated by the first frequency offset.

11. The method of claim 1, further comprising, in response to detecting motion at the first node or the second node:

at the first node:
transmitting a third calibration signal at a third phase-of-departure measured by the first clock; and
transmitting a fourth calibration signal at a fourth phase-of-departure measured by the first clock;

at the second node:
receiving the third calibration signal at a third phase-of-arrival measured by the second clock adjusted by the first frequency offset; and
receiving the fourth calibration signal at a fourth phase-of-arrival measured by the second clock adjusted by the first frequency offset;

defining a third calibration point in a second set of calibration points, the third calibration point representing the third phase-of-departure and the third phase-of-arrival;

defining a fourth calibration point in the second set of calibration points, the fourth calibration point representing the fourth phase-of-departure and the fourth phase-of-arrival;

calculating a second regression on the second set of calibration points; and calculating a second frequency offset between the first clock and the second clock compensated by the first frequency offset.

12. A method comprising:

scheduling transmission, from a first node, of a first calibration signal at a first phase-of-departure measured by a first clock of the first node;

scheduling transmission, from the first node, of a second calibration signal at a second phase-of-departure measured by the first clock and succeeding transmission of the first calibration signal by an initial signal interval;

receiving, from a second node, a first phase-of-arrival measured by a second clock of the second node, the first phase-of-arrival corresponding to reception of the first calibration signal at the second node;

receiving, from the second node, a second phase-of-arrival measured by the second clock, the second phase-of-arrival corresponding to reception of the second calibration signal at the second node;

defining a first calibration point in a first set of calibration points, the first calibration point representing the first phase-of-departure and the first phase-of-arrival;

defining a second calibration point in the first set of calibration points, the second calibration point representing the second phase-of-departure and the second phase-of-arrival;

calculating a first regression on the first set of calibration points; and calculating a first frequency offset between the first clock and the second clock based on the first regression.

13. The method of claim 12, further comprising scheduling a data transfer slot for the first node, the data transfer slot characterized by a slot duration less than the initial signal interval by at least a duration of the first calibration signal.

14. The method of claim 12:

wherein scheduling transmission, from the first node, of the first calibration signal at the first phase-of-departure further comprises scheduling transmission, from the first node, of the first calibration signal at the first phase-of-departure during a transmission slot at the first node;

wherein scheduling transmission, from the first node, of the second calibration signal at the second phase-of-departure further comprises scheduling transmission, from the first node, of the second calibration signal at the second phase-of-departure during the transmission slot at the first node; and further comprising scheduling, at the second node, a reception slot spanning the transmission slot.

15. The method of claim 12, further comprising:

receiving, from a third node, a third phase-of-arrival measured by a third clock of the third node, the third phase-of-arrival corresponding to reception of the first calibration signal at the third node;

receiving, from the third node, a fourth phase-of-arrival measured by the third clock, the fourth phase-of-arrival corresponding to reception of the second calibration signal at the third node;

defining a third calibration point in a second set of calibration points, the third calibration point representing the first phase-of-departure and the third phase-of-arrival;

defining a fourth calibration point in the second set of calibration points, the fourth calibration point representing the second phase-of-departure and the fourth phase-of-arrival;

calculating a second regression on the second set of calibration points; and calculating a second frequency offset between the first clock and the third clock based on the second regression.

16. The method of claim 12, further comprising:

calculating a timestamping noise of the second clock relative to the first clock based on a residual of the first regression;

calculating an adjusted signal interval based on the timestamping noise;

scheduling transmission, from the first node, of a third calibration signal at a third phase-of-departure measured by the first clock;

scheduling transmission, from the first node, of a fourth calibration signal at a fourth phase-of-departure measured by the first clock and succeeding transmission of the third calibration signal by the adjusted signal interval;

receiving, from a third node, a third phase-of-arrival measured by a third clock of the third node, the third phase-of-arrival corresponding to reception of the third calibration signal at the third node;

receiving, from the third node, a fourth phase-of-arrival measured by the third clock, the fourth phase-of-arrival corresponding to reception of the fourth calibration signal at the third node;

defining a third calibration point in a second set of calibration points, the third calibration point representing the third phase-of-departure and the third phase-of-arrival;

defining a fourth calibration point in the second set of calibration points, the fourth calibration point representing the fourth phase-of-departure and the fourth phase-of-arrival;

calculating a second regression on the second set of calibration points; and calculating a second frequency offset between the first clock and the third clock based on the second regression.

17. A method for calculating a frequency offset between two clocks comprising:

at a first node:
transmitting a first calibration signal at a first time-of-departure measured by a first clock of the first node; and
transmitting a second calibration signal at a second time-of-departure measured by the first clock and succeeding the first time-of-departure by an initial signal interval;

at a second node:
receiving the first calibration signal at a first time-of-arrival measured by a second clock of the second node; and
receiving the second calibration signal at a second time-of-arrival measured by the second clock;

defining a first calibration point, in a first set of calibration points, the first calibration point representing the first time-of-departure and the first time-of-arrival;

defining a second calibration point, in the first set of calibration points, the second calibration point representing the second time-of-departure and the second time-of-arrival; and calculating a first frequency offset between the first clock and the second clock based on the first set of calibration points.

18. The method of claim 17, wherein calculating the first frequency offset between the first clock and the second clock based on the first set of calibration points comprises:

calculating a first regression on the first set of calibration points; and calculating the first frequency offset between the first clock and the second clock based on the first regression.

19. The method of claim 17:

wherein transmitting the first calibration signal at the first time-of-departure measured by the first clock of the first node comprises transmitting the first calibration signal at a first phase-of-departure measured by the first clock of the first node, the first phase-of-departure, $\angle_{1,1}$, equal to $2\pi f_c T_{1,1} \bmod 2\pi$, wherein:

$T_{1,1}$ represents the first time-of-departure; and $f_c$ represents a carrier frequency of the first calibration signal;

wherein transmitting the second calibration signal at the second time-of-departure measured by the first clock and succeeding the first time-of-departure by an initial signal interval comprises transmitting the second calibration signal at a second phase-of-departure measured by the first clock, the second phase-of-departure, $\angle_{2,1}$, equal to $2\pi f_c T_{2,1} \bmod 2\pi$, wherein $T_{2,1}$ represents the second time-of-departure;

wherein receiving the first calibration signal at the first time-of-arrival measured by the second clock of the second node comprises receiving the first calibration signal at a first phase-of-arrival measured by the second clock of the second node, the first phase-of-arrival, $\angle_{1,2}$, is equal to $2\pi f_c T_{1,2} \bmod 2\pi$, wherein $T_{1,2}$ represents the first time-of-arrival; and wherein receiving the second calibration signal at the second time-of-arrival measured by the second clock comprises receiving the second calibration signal at a second phase-of-arrival measured by the second clock of the second node, the second phase-of-arrival, $\angle_{2,2}$, is equal to $2\pi f_c T_{2,2} \bmod 2\pi$, wherein $T_{2,2}$ represents the second time-of-arrival.

20. The method of claim 19:

further comprising, for each carrier frequency, $f_c$, in a range of carrier frequencies, calculating $\angle_{1,1}$, $\angle_{2,1}$, $\angle_{1,2}$, and $\angle_{2,2}$;

wherein defining the first calibration point, in the first set of calibration points, the first calibration point representing the first time-of-departure and the first time-of-arrival comprises, for each carrier frequency, $f_c$, in the range of carrier frequencies, defining the first calibration point, in the first set of calibration points as $(\angle_{1,1}, \angle_{1,2})$;

wherein defining a second calibration point, in the first set of calibration points, the second calibration point representing the second time-of-departure and the second time-of-arrival comprises, for each carrier frequency, $f_c$, in the range of carrier frequencies, defining the second calibration point, in the first set of calibration points as $(\angle_{2,1}, \angle_{2,2})$; and wherein calculating the first frequency offset between the first clock and the second clock based on the first set of calibration points comprises calculating the first frequency offset between the first clock and the second clock based on the first set of calibration points for each carrier frequency, $f_c$, in the range of carrier frequencies.

* * * * *